(12) United States Patent
Sundaresan et al.

(10) Patent No.: US 9,811,732 B2
(45) Date of Patent: Nov. 7, 2017

(54) SYSTEMS AND METHODS FOR OBJECT TRACKING

(71) Applicant: QUALCOMM Incorporated, San Diego, CA (US)

(72) Inventors: Sairam Sundaresan, San Diego, CA (US); Dashan Gao, San Diego, CA (US); Xin Zhong, San Diego, CA (US); Yingyong Qi, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 46 days.

(21) Appl. No.: 14/792,436

(22) Filed: Jul. 6, 2015

(65) Prior Publication Data

US 2016/0267325 A1    Sep. 15, 2016

Related U.S. Application Data

(60) Provisional application No. 62/132,332, filed on Mar. 12, 2015.

(51) Int. Cl.
| | |
|---|---|
| *G06K 9/00* | (2006.01) |
| *G06K 9/46* | (2006.01) |
| *G06K 9/52* | (2006.01) |
| *G06T 7/215* | (2017.01) |

(52) U.S. Cl.
CPC ........... *G06K 9/00624* (2013.01); *G06K 9/46* (2013.01); *G06K 9/52* (2013.01); *G06T 7/215* (2017.01); *G06K 2009/4666* (2013.01); *G06T 2207/10016* (2013.01); *G06T 2210/12* (2013.01)

(58) Field of Classification Search
CPC ....... G06K 2009/4666; G06K 9/00624; G06K 9/46; G06K 9/52; G06T 2207/10016; G06T 2210/12; G06T 7/2006
USPC ........................................ 382/103, 104, 107
See application file for complete search history.

(56) References Cited

U.S. PATENT DOCUMENTS

| | | | |
|---|---|---|---|
| 8,644,645 B2* | 2/2014 | Chuang ................. | G06T 3/4069 382/275 |
| 2005/0074154 A1 | 4/2005 | Georgescu et al. | |
| 2011/0150284 A1 | 6/2011 | Son et al. | |
| 2012/0020524 A1* | 1/2012 | Ishikawa ................ | H04N 7/183 382/103 |

(Continued)

OTHER PUBLICATIONS

International Search Report and Written Opinion—PCT/US2016/014745—ISA/EPO—dated Jun. 8, 2016.

(Continued)

*Primary Examiner* — Tom Y Lu

(57) ABSTRACT

A method performed by an electronic device is described. The method includes determining a local motion pattern by determining a set of local motion vectors within a region of interest between a previous frame and a current frame. The method also includes determining a global motion pattern by determining a set of global motion vectors between the previous frame and the current frame. The method further includes calculating a separation metric based on the local motion pattern and the global motion pattern. The separation metric indicates a motion difference between the local motion pattern and the global motion pattern. The method additionally includes tracking an object based on the separation metric.

30 Claims, 20 Drawing Sheets

(56) References Cited

U.S. PATENT DOCUMENTS

| | | | |
|---|---|---|---|
| 2012/0250945 A1* | 10/2012 | Peng | G06T 7/2013 382/107 |
| 2013/0094696 A1* | 4/2013 | Zhang | G06T 7/0044 382/103 |
| 2014/0205141 A1 | 7/2014 | Gao et al. | |
| 2014/0270484 A1 | 9/2014 | Chandraker et al. | |
| 2015/0016684 A1* | 1/2015 | Matsumoto | G06T 7/0042 382/103 |
| 2015/0063628 A1 | 3/2015 | Bernal et al. | |

OTHER PUBLICATIONS

Kanavati F, "Motion Stabilisation for Dynamic Medical Image Sequences," Sep. 1, 2013 (Sep. 1, 2013), pp. 1-91, XP055275961, Retrieved from the Internet: URL:http://www.doc.ic.ac.uk/teaching/distinguished-projects/2013/f.kanavati.pdf [retrieved on May 27, 2016].

Liu S, "Object Trajectory Estimation using Optical Flow," Jan. 1, 2009 (Jan. 1, 2009), XP055275964, Retrieved from the Internet: URL:http://www.ece.usu.edu/grad/reports_theses_disseratations/2009/liu_shuo/thesis.pdf [retrieved on May 27, 2016].

Odobez J.M., et al., "Separation of Moving Regions from Background in an Image Sequence Acquired with a Mobile Camera," Jan. 31, 1997 (Jan. 31, 1997), pp. 1-26, XP055275917, Retrieved from the Internet: URL:http://citeseer.ist.psu.edu/viewdoc/download;jsessionid=72AC1AFB28662E98203E12A6.

Kalal Z., et al., "Forward-Backward Error: Automatic Detection of Tracking Failures," International Conference on Pattern Recognition 2010, Aug. 23-26, 2010, Istanbul, Turkey, pp. 2756-2759, XP31771139.

\* cited by examiner

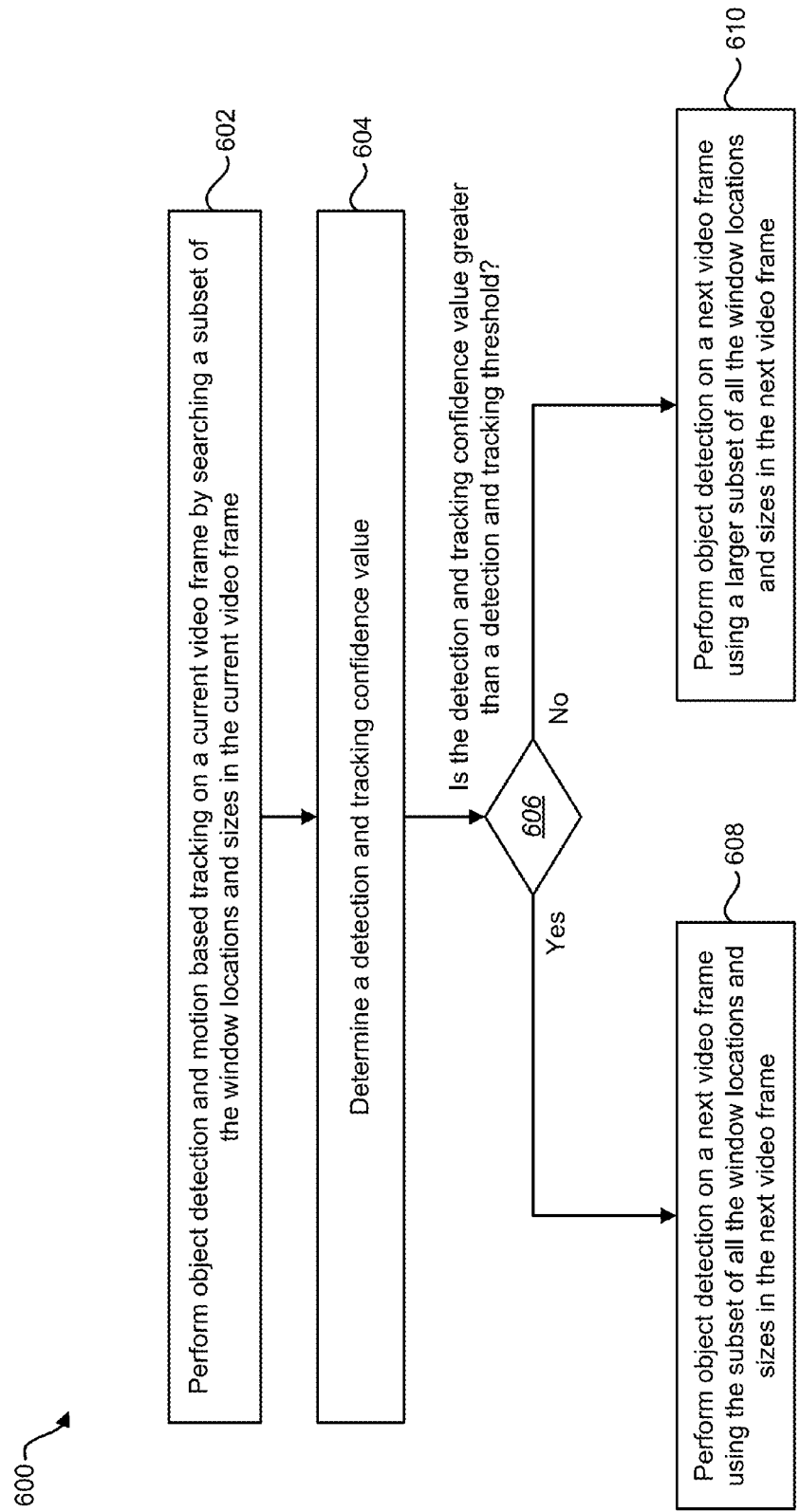

SYSTEMS AND METHODS FOR OBJECT TRACKING

CROSS-REFERENCE TO RELATED APPLICATION

This application is related to and claims priority to U.S. Provisional Patent Application Ser. No. 62/132,332, filed Mar. 12, 2015, for "SYSTEMS AND METHODS FOR OBJECT TRACKING," the entire contents of which are incorporated herein by reference.

FIELD OF DISCLOSURE

The present disclosure relates generally to electronic devices. More specifically, the present disclosure relates to systems and methods for object tracking.

BACKGROUND

Some electronic devices (e.g., cameras, video camcorders, digital cameras, cellular phones, smart phones, computers, televisions, automobiles, personal cameras, action cameras, surveillance cameras, mounted cameras, connected cameras, robots, drones, smart applications, healthcare equipment, set-top boxes, etc.) capture and/or process images. For example, a smartphone may capture and/or process still and/or video images. Processing images may demand a relatively large amount of time, memory and energy resources. The resources demanded may vary in accordance with the complexity of the processing.

It may be difficult to detect and/or track objects in images. For example, tracking may be lost in some situations. As can be observed from this discussion, systems and methods that improve image processing may be beneficial.

SUMMARY

A method performed by an electronic device is described. The method includes determining a local motion pattern by determining a set of local motion vectors within a region of interest between a previous frame and a current frame. The method also includes determining a global motion pattern by determining a set of global motion vectors between the previous frame and the current frame. The method further includes calculating a separation metric based on the local motion pattern and the global motion pattern. The separation metric indicates a motion difference between the local motion pattern and the global motion pattern. The method additionally includes tracking an object based on the separation metric.

The method may include measuring a distance error of each of the local motion vectors. The method may also include rejecting one or more of the local motion vectors that have an amount of distance error. The method may include calculating a global motion consistency measure.

Calculating the separation metric may include fitting the global motion pattern to a global motion model. Calculating the separation metric may also include calculating fitting errors between the global motion model and the local motion pattern. The global motion model may include at least one statistical measure of the global motion pattern.

The method may include calculating a foreground weight map based on the separation metric. The method may include smoothing the foreground weight map over time. The method may include refining the foreground weight map over space. Refining the foreground weight map over space may include multiplying the foreground weight map by a centrally weighted kernel. The method may include smoothing a historical weight map over time.

An electronic device is also described. The electronic device includes a processor configured to determine a local motion pattern by determining a set of local motion vectors within a region of interest between a previous frame and a current frame and to determine a global motion pattern by determining a set of global motion vectors between the previous frame and the current frame. The processor is also configured to calculate a separation metric based on the local motion pattern and the global motion pattern. The separation metric indicates a motion difference between the local motion pattern and the global motion pattern. The processor is also configured to track an object based on the separation metric.

An apparatus is also described. The apparatus includes means for determining a local motion pattern. The means for determining the local motion pattern includes means for determining a set of local motion vectors within a region of interest between a previous frame and a current frame. The apparatus also includes means for determining a global motion pattern. The means for determining the global motion pattern includes means for determining a set of global motion vectors between the previous frame and the current frame. The apparatus further includes means for calculating a separation metric based on the local motion pattern and the global motion pattern. The separation metric indicates a motion difference between the local motion pattern and the global motion pattern. The apparatus additionally includes means for tracking an object based on the separation metric.

A computer-program product is also described. The computer-program product includes a non-transitory computer-readable medium with instructions. The instructions include code for causing an electronic device to determine a local motion pattern by determining a set of local motion vectors within a region of interest between a previous frame and a current frame. The instructions also include code for causing the electronic device to determine a global motion pattern by determining a set of global motion vectors between the previous frame and the current frame. The instructions further include code for causing the electronic device to calculate a separation metric based on the local motion pattern and the global motion pattern. The separation metric indicates a motion difference between the local motion pattern and the global motion pattern. The instructions additionally include code for causing the electronic device to track an object based on the separation metric.

BRIEF DESCRIPTION OF THE DRAWINGS

FIG. 6 is a flow diagram illustrating a method for performing object detection and tracking;

DETAILED DESCRIPTION

Object tracking may include locating an object in a series of images (from frame to frame, for example). Tracking an object in a series of images (e.g., image data, image frames, video, etc.) and/or a user defined region of interest in those images using a camera may be difficult. Real-time performance (~30 frames per second (fps)) may be required. Some configurations may combine the output of an optical flow-based tracker and an image content-based detector to obtain robust tracking. However, the computation of the existing algorithms make it difficult to achieve real-time performance.

The present systems and methods may implement one or more of the following techniques to improve the speed of the tracking and detection algorithms: (1) using a fraction of possible detection (e.g., scanning) windows at each frame (e.g. randomly select the window positions or utilize a scanning pattern); (2) selecting only a limited range of spatial scales (e.g., only a subset of available spatial scales) for object detection that are close in scale to a scale corresponding to a previous detected target size; (3) based on the confidence value of previous tracking, determining either to search for the object in a partial image or the entire image; (4) dynamically adjusting the number of the detection windows based on previous tracking results; (5) performing tracking and detection sequentially (e.g., applying the tracker first, since it is less computationally expensive); (6) running an object detector only when the confidence of the tracker is lower than a threshold; and (7) setting a number of scanning steps proportional to a total number of image locations. One of the advantages of the present methods and systems is to reduce computations used to track and/or detect a target object.

As used herein, the term "track" and its variants refer to a process that is motion-based, not identifying a specific object. For example, an object tracking and detection module may track motion from frame to frame and determine a location, size or frame of the target object based on movement of an electronic device (e.g., if the camera is panning) or movements of objects from frame to frame. The term "detect" and its variants refers to a process that attempts to identify a target object or a type of target object, e.g., by comparing a portion of a frame to a reference image. For example, an object tracking and detection module may compare portions of captured frames to a reference image (of the target object) in an attempt to identify a target object. In one example, detection may be used when a target can no longer be tracked (e.g., if an object falls outside the field of view). Systems and methods of performing motion-based tracking and object detection are explained in greater detail below.

Figure 1:
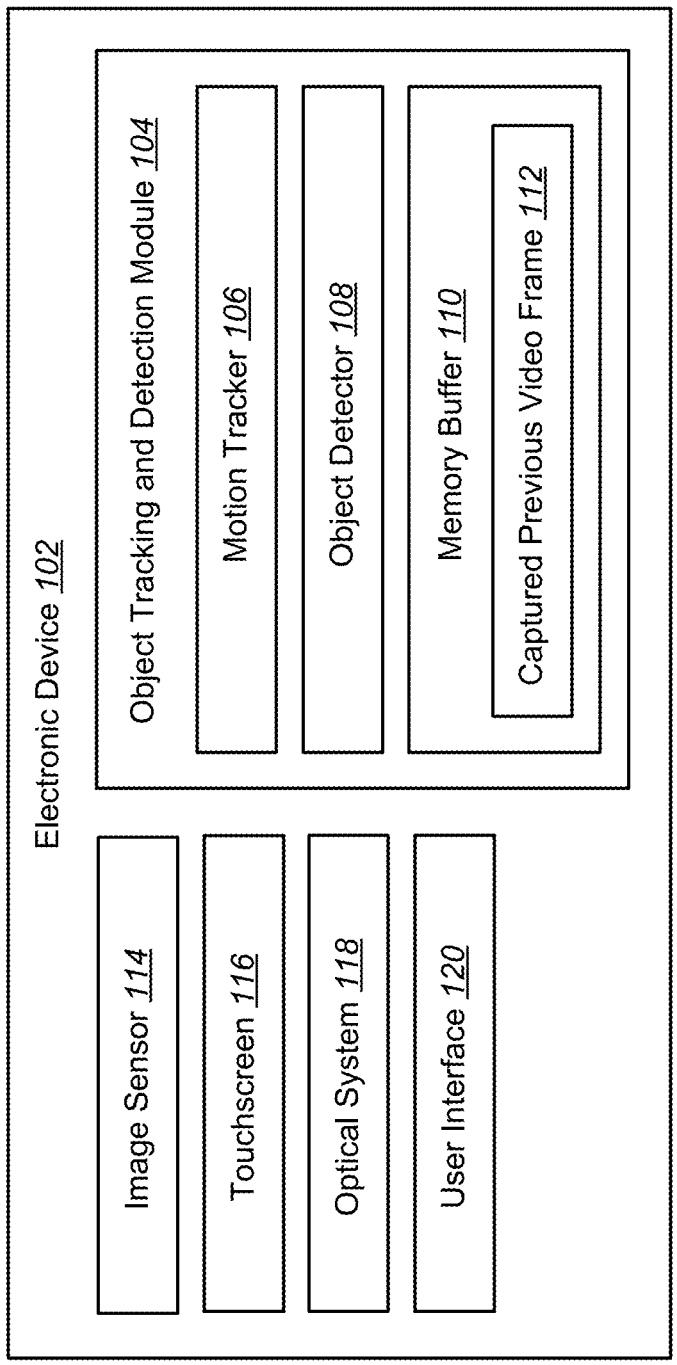
FIG. 1 is a block diagram illustrating an electronic device for tracking and detecting a target object.

FIG. 1 is a block diagram illustrating an electronic device 102 for tracking and detecting a target object. Examples of electronic devices 102 include laptop or desktop computers, cellular phones, smart phones, wireless modems, e-readers, tablet devices, gaming systems, robots, aircraft, unmanned aerial vehicles (UAVs), automobiles, wearable devices, personal cameras, action cameras, mounted cameras, etc. Some of these devices may operate in accordance with one or more industry standards.

An electronic device 102, such as a smartphone or tablet computer, for example, may include a camera. The camera may include an image sensor 114 and an optical system 118 (e.g., lenses) that focuses images of objects that are located within the field of view of the optical system 118 onto the image sensor 114. An electronic device 102 may also include a camera software application and a display screen. When the camera application is running, images of objects that are located within the field of view of the optical system 118 may be recorded by the image sensor 114 and may be displayed on the display screen. The present systems and methods may be described in terms of one or more images and/or video frames interchangeably.

A user interface 120 of the camera application may permit one or more objects that are being displayed on the display screen to be tracked. The user of the electronic device 102 may be permitted to select the object(s) that is/are to be tracked and/or detected. Additionally or alternatively, the object to be tracked (e.g., face, eye, person, shape, box, etc.) may be predetermined and/or may conform to a model.

In one configuration, the display is a touchscreen 116 that receives input from physical touch, e.g., by a finger, stylus or other tool. In some configurations, the touchscreen 116 may receive touch input (e.g., touch point, drawn enclosure such as a circle or box) defining a target object to be tracked and/or detected. In some configurations, the electronic device 102 may automatically determine a target object for tracking and/or detection. In some configurations, multiple objects may be tracked.

The electronic device 102 may include an object tracking and detection module 104 for tracking a selected object and/or detecting the object in a video frame. The object tracking and detection module 104 may include a motion tracker 106 for tracking one or more objects and/or an object detector 108 for detecting an object on a video frame.

The motion tracker 106 may be motion-based for tracking motion of points on an image (e.g., a video frame) from frame to frame to estimate the location and/or change of location of a target object between a previous video frame and a current video frame. The object detector 108 may use an object model, rather than a motion-based model, to detect an object by comparing all or a portion of a current video frame to a selected object or portion of a captured previous video frame 112 (e.g., in a sequence of video frames). The object detector 108 may be used for detecting multiple objects within a video frame. In some configurations, the object detector 108 may scan one or more frames and/or images in order to detect a particular object. The object detector 108 may scan one or more frames as described herein.

The object tracking and detection module 104 may also include a memory buffer 110. The memory buffer 110 may store one or more captured frames and data associated with the captured video frames. In one example, the memory buffer 110 may store a previous captured video frame 112. The object tracking and detection module 104 may use data provided from the memory buffer 110 about a captured previous video frame 112 in performing motion-based tracking and/or object detection. In some configurations, the memory buffer 110 may provide location and window size data to the motion tracker 106 and the object detector 108 may provide the motion tracker 106 and object detector 108 one or more parameters that may be used to more accurately track and/or detecting the object.

The electronic device 102 may perform motion-based tracking. One approach is a median flow method, in which the motion tracker 106 accepts a pair of images $I_t$, $I_{t+1}$ (e.g., video frames) and a bounding box $\beta_t$ and outputs a bounding box $\beta_{t+1}$. A set of points may be initialized on a rectangular grid within the bounding box $\beta_t$ and tracks the points to generate a sparse motion flow between $I_t$ and $I_{t+1}$. A quality of the point prediction may be estimated and each point assigned an error. A portion (e.g., 50%) of the worst predictions may be filtered out while the remaining predictions are used to estimate the displacement of the whole bounding box. The motion tracker 106 may perform motion-based tracking on each video frame captured by an electronic device 102. In another approach, motion-based tracking may be performed by calculating one or more gradients (e.g., x and y gradients) and using the difference between a pair of frames to calculate a time gradient and using the multiple gradient values to accurately track a target object within a current video frame. Further details regarding motion-based tracking are provided below.

When performing motion-based tracking, the motion tracker 106 may determine a tracking confidence value (between 0 and 1, for example) based on a calculated or estimated accuracy of the motion-tracking method. The tracking confidence value may indicate a likelihood or probability that a target object falls within a current video frame or a defined window of the video frame. If the tracking confidence value is greater than a tracking threshold, the likelihood may be high that the target object is found within the current video frame. Otherwise, the likelihood may be low or uncertain whether the target object is found within the current video frame. Various approaches for determining a tracking confidence value may be used (e.g., calculating a normalized cross correlation (NCC) between a tracked window (e.g., a tracking patch window) in a current video frame and previously stored image patches from previously captured video frames).

The electronic device 102 may also perform object detection. Object detection may be performed using a variety of approaches (e.g., scanning window, scanning step, etc.). For example, all or a subset of all possible window locations and sizes may be searched in a video frame.

In some configurations, the motion tracker 106 and object detector 108 may operate sequentially rather than in parallel. For example, the electronic device 102 may perform motion-based tracking of a selected object (e.g., target object) and sequentially perform object detection of the selected object based on one or more tracked parameters (e.g., a region of a target object, a window location, a window size, a scale level, a target size, a tracking and/or detection confidence value or other parameter). For example, if a tracking confidence value is below a tracking threshold, the electronic device 102 may perform object detection. Alternatively, if a tracking confidence value is above a tracking threshold, the electronic device 102 may skip object detection for a current video frame and continue performing motion-based tracking on a next video frame based on the motion tracking results of the current video frame. Because motion-based tracking may be less computationally intensive than object detection, an electronic device 102 may skip performing object detection where motion-based tracking may be used to accurately track a target object within a current video frame.

Figure 2:
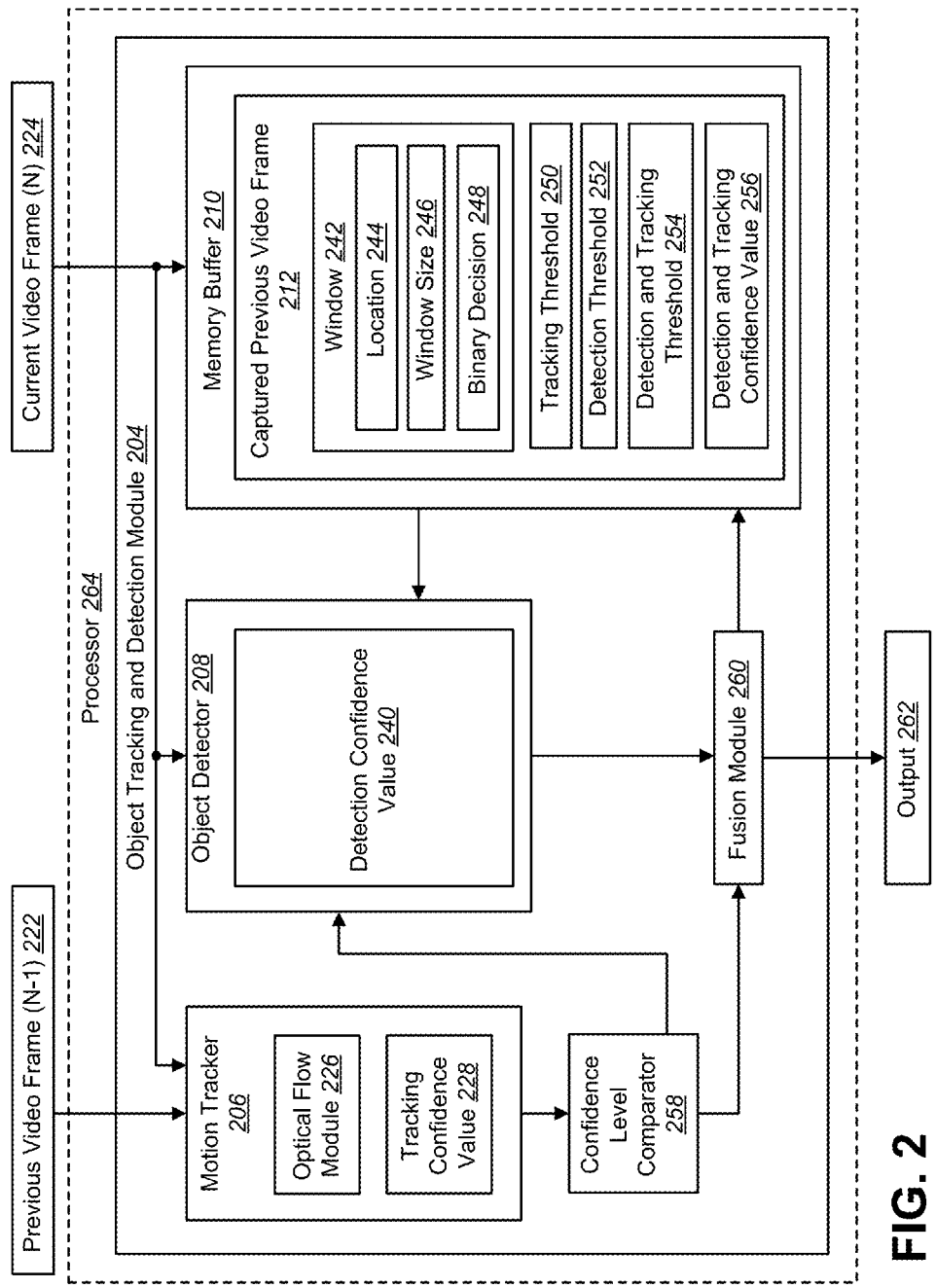
FIG. 2 is a block diagram illustrating an object tracking and detection module.

FIG. 2 is a block diagram illustrating an object tracking and detection module 204. The object tracking and detection module 204 may be implemented within an electronic or wireless device (e.g., electronic device 102). The object tracking and detection module 204 may include a motion tracker 206 having an optical flow module 226 and a tracking confidence value 228. The object tracking and detection module 204 may also include an object detector 208 having a detection confidence value 240. The memory buffer 210 may store data associated with a captured previous video frame 212 that may be provided to the motion tracker 206 and object detector 208. The object tracking and detection module 204, motion tracker 206, object detector 208 and memory buffer 210 may be configurations of the corresponding elements described above in connection with FIG. 1.

The motion tracker 206 may be used to perform motion-based tracking on a current video frame (N) 224. For example, a previous video frame (N-1) 222 and a current video frame (N) 224 may be received (e.g., by the electronic device). The previous video frame (N-1) 222 may immediately precede a current video frame (N) 224 in a sequence of video frames. Additional video frames may be obtained and processed by the object tracking and detection module 204. The previous video frame (N-1) 222 may be provided to a motion tracker 206. Further, the memory buffer 210 may store data associated with the previous video frame (N-1) 222, referred to herein as a captured previous video frame 212. In some configurations, the memory buffer 210 may obtain information about the previous video frame (N-1) 222 directly from the electronic device (e.g., from the camera). The memory buffer 210 may also obtain tracking results about the previous video frame (N-1) 222 from the fusion module 260 which may specify where an object was tracked and/or detected in the previous video frame (N-1) 222. This information about the previous video frame (N-1) 222 or other previously captured video frames may be stored in the memory buffer 210.

The motion tracker 206 may subsequently receive a current video frame (N) 224 in a sequence of video frames. The motion tracker 206 may compare the current video frame (N) 224 to the previous video frame (N-1) 222 (e.g., using information provided from the memory buffer 210). The motion tracker 206 may track motion of an object on the current video frame (N) 224 using an optical flow module 226. The optical flow module 226 may include hardware and/or software for performing motion-based tracking of an object on a current video frame (N) 224. By comparing the previous video frame (N-1) 222 and the current video frame (N) 224, the motion tracker 206 may determine a tracking confidence value 228 associated with the likelihood that a target object is in the current video frame (N) 224. In one example, the tracking confidence value 228 is a real number (e.g., between 0 and 1) based on a percentage of certainty that the target object is within the current video frame (N) 224 or a window within the current video frame (N) 224.

The object detector 208 may be used to detect an object on a current video frame (N) 224. For example, the object detector 208 may receive a current video frame (N) 224 in a sequence of video frames. The object detector 208 may perform object detection on the current video frame (N) 224 based on a tracked parameter (e.g., tracking confidence value 228 compared to a tracking threshold 250 and/or information provided from the memory buffer 210 (e.g., a region, a window location, a window size, or other information).

The object detector 208 may select multiple windows within a video frame. The selected scanning windows may follow a particular scanning pattern (e.g., sliding window, scanning step, etc.). More detail is given in connection with FIGS. 11-16. The object detector 208 may determine whether some or all of a target object is found in a specific window. The object detector 208 may determine a detection confidence value 240 indicating a likelihood that the target object is present within a current video frame (N) 224. The object detector 208 may perform object detection according to a variety of tracked parameters, including a region, target size, window size, scale level, window location and/or one or more confidence values.

The object detector 208 may search all or a subset of window locations and/or sizes. If detection is unsuccessful (e.g., the detection confidence value 240 is less than a detection threshold 252 (e.g., e.g., 0.6, 0.65, 0.7, 0.75, 0.8, 0.85, etc.)), a higher percentage of window locations may be searched in a subsequent captured frame, e.g., 2%.

The object tracking and detection module 204 may include a fusion module 260 to merge multiple windows to form a single window. There may be initially two confidence values: a detection confidence value 240 from the object detector 208 and a tracking confidence value 228 from the motion tracker 206. The fusion module 260 may compare and/or combine the two confidence values (e.g., pick the one that is larger) into a detection and tracking confidence value 256. The detection and tracking confidence value 256 may serve as an overall indication of the likelihood that a target object was found. Further, the detection and tracking confidence value 256 may be a parameter used for determining image scale, window location, window size or percentage of windows to search in a next video frame. The fusion module 260 may be used to provide information (e.g., window location, window size, etc.) about a current video frame (N) 224 and/or a detection and tracking confidence value 256 to the memory buffer 210. The fusion module 260 may use the tracking results (e.g., bounding boxes) from the motion tracker 206 and object detector 208 to form a combined tracking result (e.g., bounding box) and calculate the detection and tracking confidence value 256.

The memory buffer 210 may store one or more values associated with the previous video frame (N-1) 222, the current video frame (N) 224 or other captured video frames. In one configuration, the memory buffer 210 stores a captured previous video frame 212, which may include information corresponding to the previous video frame (N-1) 222. The captured previous video frame 212 may include information about one or more windows 242 (e.g., location 244, window size 246, a binary decision 248, etc.) for each window 242. Additionally or alternatively, the captured previous video frame 212 may include information about the image scale (e.g., scale level) in which the object was last detected and/or tracked.

The captured previous video frame 212 may also include a tracking threshold 250, detection threshold 252 and a detection and tracking threshold 254. The tracking threshold 250 may be provided to the motion tracker 206 or circuitry on the object tracking and detection module 204 (e.g., confidence level comparator 258) to determine whether the tracking confidence level is greater than the tracking threshold 250. The detection threshold 252 may be provided to the object detector 208 or other circuitry on the object tracking and detection module 204 to determine whether the detection confidence value 240 is greater than the detection threshold 252. The detection and tracking threshold 254 may be a combined value based on the tracking threshold 250 and the detection threshold 252. The detection and tracking threshold 254 may be compared to a detection and tracking confidence value 256 to determine a combined confidence value for the motion-based tracking and the object detection. Each of the thresholds may be based on a likelihood that a target object is located within a video frame. The object tracking and detection module 204 may perform motion-based tracking and/or detection on a current video frame (N) 224 until a specific detection and tracking confidence value 256 is obtained. Further, the motion-based tracking and object detection may be performed on each video frame in a sequence of multiple video frames.

In one configuration of a two-step tracking and detection approach, the motion tracker 206 may perform motion-based tracking on a current video frame (N) 224. The motion tracker 206 may determine a tracking confidence value 228 based on the motion-based tracking process. Using the tracking confidence value 228 and a tracking threshold 250 provided by the memory buffer 210, a confidence level comparator 258 may determine whether the tracking confidence value 228 exceeds a tracking threshold 250. If the tracking confidence value 228 is greater than the tracking threshold 250, the object tracking and detection module 204 may skip performing object detection and provide the tracking result to a fusion module 260 to produce an output 262. The output 262 may include an indication that a target object is within a current video frame (N) 224. Further, the output 262 may include additional information about the target object.

If the tracking confidence value 228 does not exceed the tracking threshold 250, the object detector 208 may subsequently perform object detection on the current video frame (N) 224. The object detection may be performed on all or a subset of windows within the current video frame (N) 224. The object detector 208 may determine a detection confidence value 240 and compare the detection confidence value 240 to a detection threshold 252. If the detection confidence value 240 is above a detection threshold 252, the object detector 208 may provide the detection result to the fusion module 260 to produce an output 262. The output 262 may include an indication that a target object is within a current video frame (N) 224 and/or include additional information about the detected object. If the detection confidence value 240 is less than or equal to a detection threshold 252, the object detector 208 may perform object detection again using a more robust method (e.g., searching a greater number of windows within the current video frame (N) 224) and may repeat the process of object detection until a satisfactory detection confidence value 240 is obtained. The object tracking and detection module 204 may be used to perform tracking and detection on a next video frame.

One or more of the illustrated components in FIG. 2 may be optionally implemented by a processor 264. One or more of the illustrated components may be implemented together or separately on one or more processors.

Figure 3:
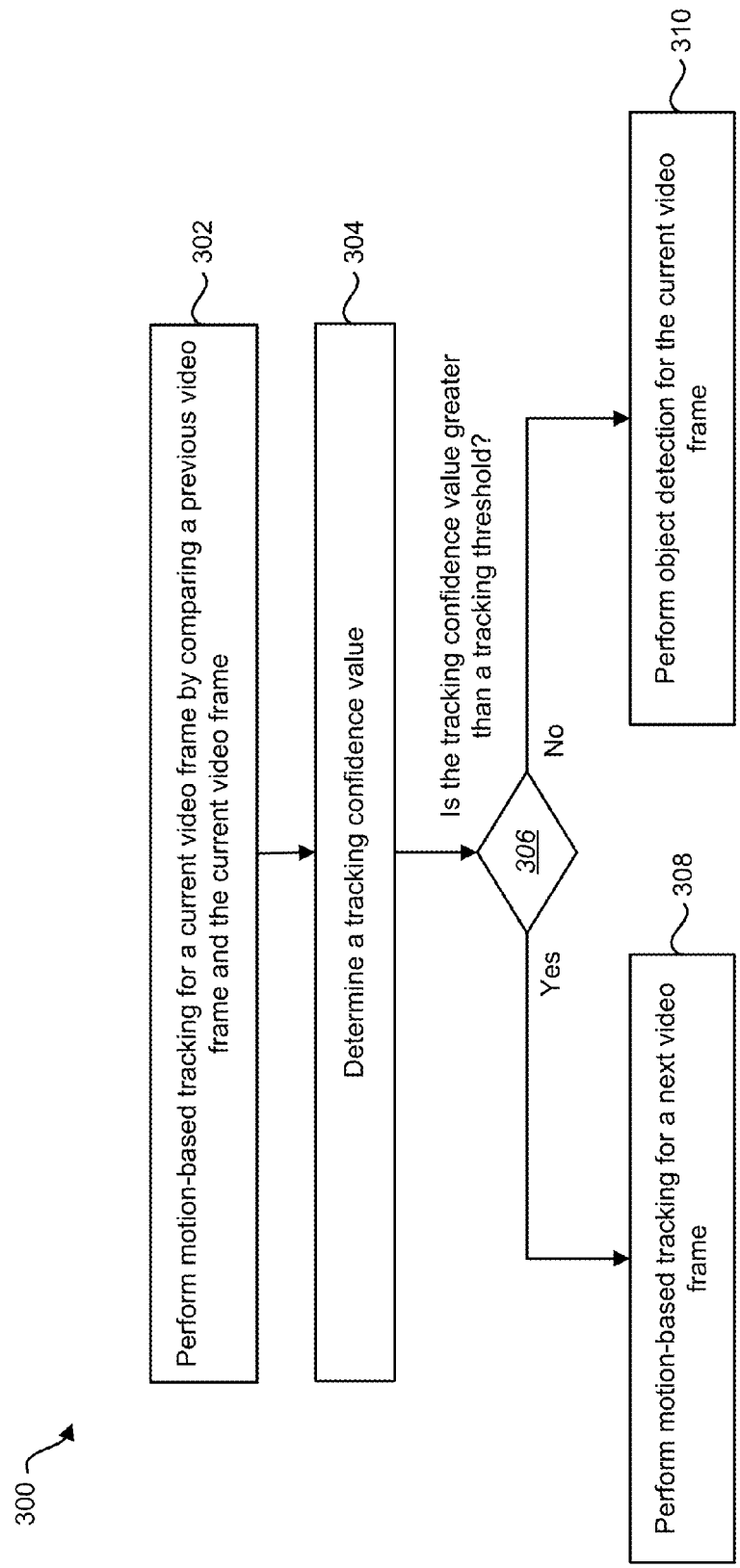
FIG. 3 is a flow diagram illustrating a method for performing motion-based tracking and object detection.

FIG. 3 is a flow diagram illustrating a method 300 for performing motion-based tracking and object detection. The method 300 may be implemented by an electronic device 102, e.g., an object tracking and detection module 104. The electronic device 102 may perform 302 motion-based tracking as described above.

The electronic device 102 may determine 304 a tracking confidence value 228. This may be accomplished as described above. The electronic device 102 may determine 306 whether the tracking confidence value 228 is greater than a tracking threshold 250. If the tracking confidence value 228 is greater than the tracking threshold 250, the electronic device 102 may perform 308 motion-based tracking for a next video frame (and optionally skip performing object detection on the current video frame based on the result of the motion-based tracking). Otherwise, the electronic device 102 may perform 310 object detection for the current video frame (N) 224 (or the next video frame, for instance).

Figure 4:
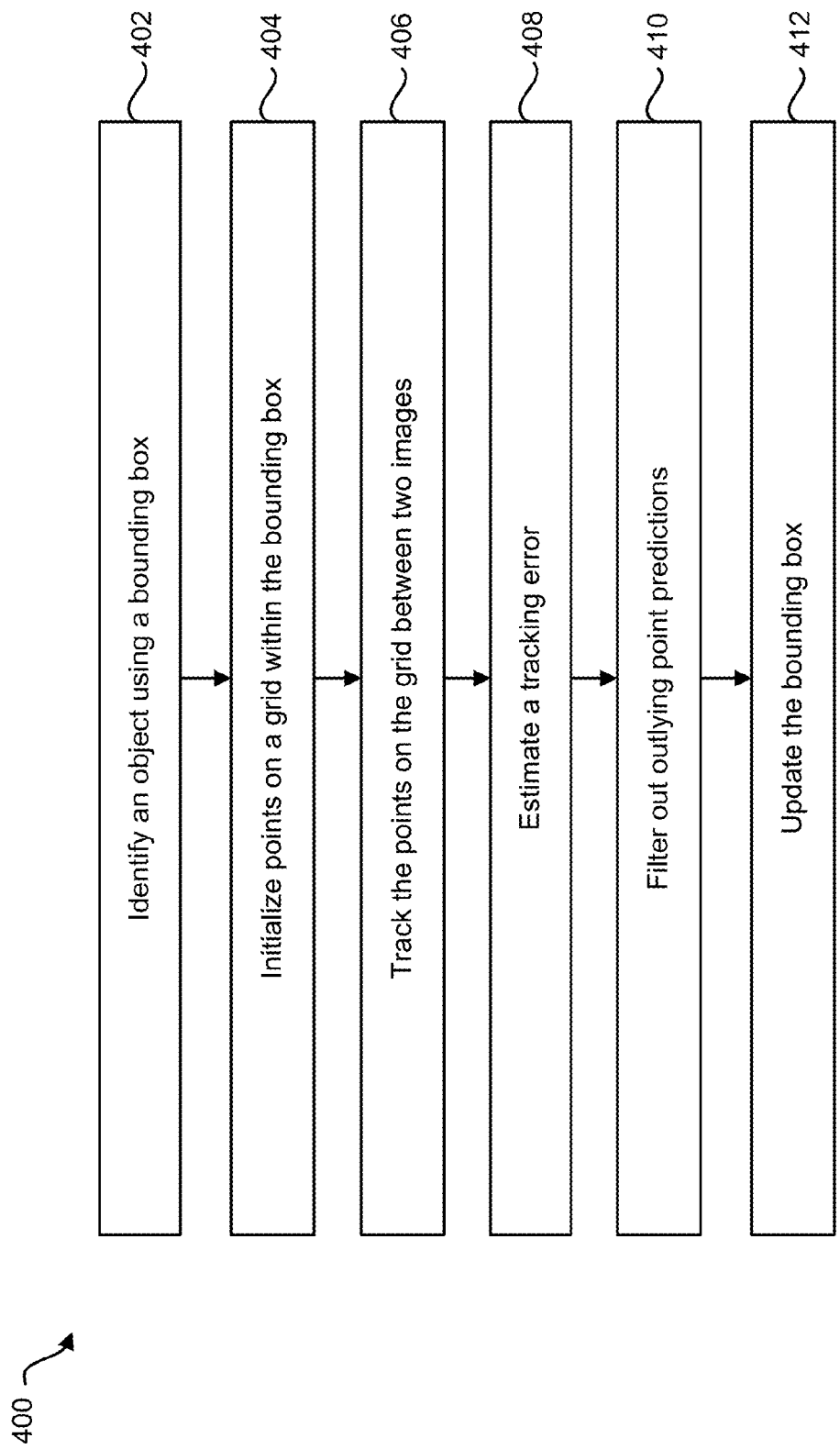
FIG. 4 is a flow diagram illustrating a method for performing motion-based tracking.

FIG. 4 is a flow diagram illustrating a method 400 for performing motion-based tracking. The method 400 may be implemented by an electronic device 102, e.g., an object tracking and detection module 104. The electronic device 102 may identify 402 one or more target objects using a bounding box as described above.

The electronic device 102 may initialize 404 points on a grid within the bounding box. The points on the grid may be uniformly spaced throughout the bounding box. Further, the points may be tracked 406 (using a Lucas-Kanade tracker, for example) on the grid between two images (e.g., previous video frame (N-1) 222 and current video frame (N) 224). The electronic device 102 may estimate 408 a tracking error (e.g., assign each point of the tracked points an error value, estimate forward-backward error, NCC and/or sum-of-square differences, etc.) between the two images. The estimated tracking error may be used to obtain a tracking confidence value 228. Further, the electronic device 102 may filter 410 out outlying point predictions (e.g., 50% of the worst predictions). The remaining predictions may be used to estimate the displacement of the bounding box.

The electronic device 102 may update 412 the bounding box. Updating 412 the bounding box may be performed such that the updated bounding box becomes the new bounding box for the next video frame.

Figure 5:
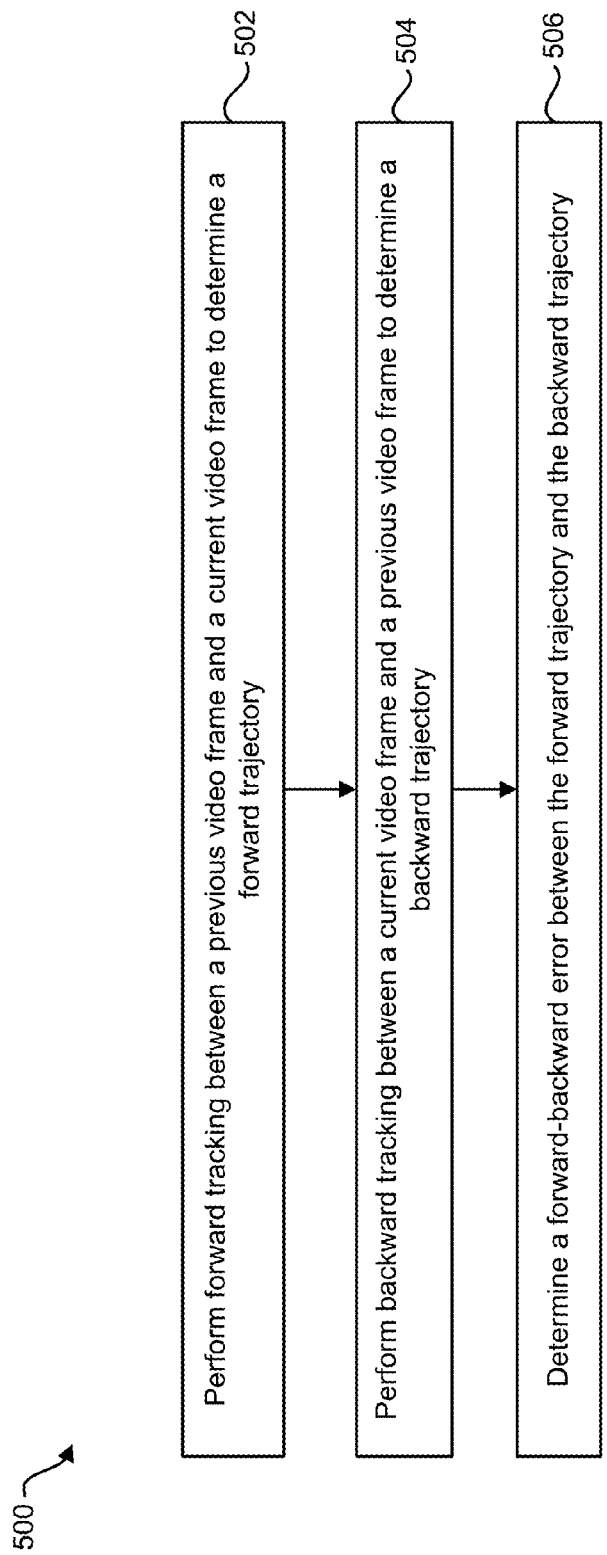
FIG. 5 is a flow diagram illustrating a method for estimating a tracking error in motion-based tracking based on forward-backward error.

FIG. 5 is a flow diagram illustrating a method 500 for estimating a tracking error in motion-based tracking based on forward-backward error. The method 500 may be implemented by an electronic device 102 (e.g., an object tracking and detection module 104). In some configurations, the electronic device 102 may calculate a NCC between tracked windows, which may be used to determine a tracking confidence value 228. The electronic device 102 may also use various tracking error estimation techniques complementary to NCC (e.g., forward-backward error, sum-of-square difference). In an example using forward-backward error estimation, an electronic device 102 may perform 502 forward tracking between a previous video frame (N-1) 222 and a current video frame (N) 224 to determine a forward trajectory. Forward tracking may include tracking an image forward for k steps. The resulting forward trajectory may be equal to $(x_t, x_{t+1}, \ldots, x_{t+k})$, where $x_t$ is a point location in time and k indicates a length of a sequence of images. The electronic device 102 may perform 504 backward tracking between a current video frame (N) 224 and a previous video frame (N-1) 222 to determine a backward trajectory. The resulting backward trajectory may be equal to $(\hat{x}_t, \hat{x}_{t+1}, \ldots, \hat{x}_{t+k})$, where $\hat{x}_{t+k} = \hat{x}_{t+k}$.

The electronic device 102 may determine 506 a forward-backward error between the forward trajectory and the backward trajectory. The forward-backward error may be defined as the distance between the forward trajectory and the backward trajectory. Further, various distances may be defined for the trajectory comparison. In one configuration, the Euclidean distance between the initial point and the end point of the validation trajectory may be used when determining the forward-backward error. In one configuration, the forward-backward error may be used as the tracking error, which may be used to determine a tracking confidence value 228.

FIG. 6 is a flow diagram illustrating a method 600 for performing object detection and tracking. The method 600 may be implemented by an electronic device 102 (e.g., an object tracking and detection module 104). The electronic device 102 may perform 602 object detection and motion-based tracking on a current video frame (N) 224 by searching a subset of the window locations and sizes in the current video frame (N) 224.

The electronic device 102 may determine 604 a detection and tracking confidence value 256. The electronic device 102 may also determine 606 whether the detection and confidence value 256 is greater than a detection and tracking threshold 254. If the detection and confidence value is greater than a detection and tracking threshold 254, the electronic device 102 may perform 608 object detection on a next video frame using the subset (e.g., the same subset) of windows and sizes in the next video frame. If the detection and confidence value 256 is less than a detection and tracking threshold 254, the electronic device 102 may perform 610 object detection on a next video frame using a larger subset of the window locations and sizes in the next video frame.

Figure 7A:
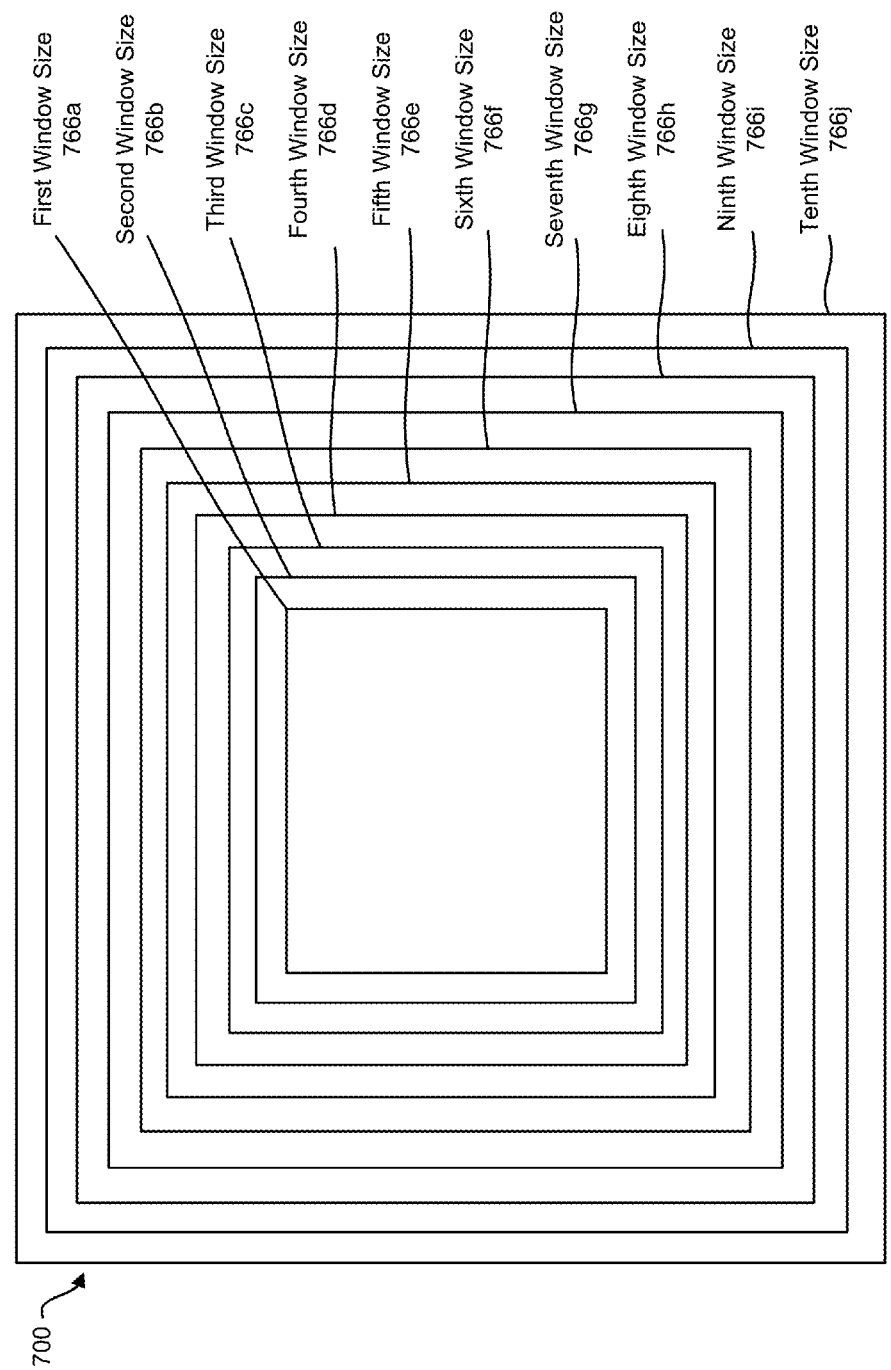
FIG. 7A is a block diagram illustrating an image window having different window sizes that may be used with the present systems and methods.

FIG. 7A is a block diagram illustrating an image window 700 having different window sizes 766*a-j* that may be used with the present systems and methods. The windows that are searched may be any shape (e.g., square, rectangular, circular, elliptical, user-defined, etc.). Furthermore, any number of window sizes may be available, e.g., 5, 15, 20, 30, etc. A search range may include all or a subset (e.g., those similar to the window location and window size associated with the target object in the recent frame) of window sizes used for a particular location.

Figure 7B:
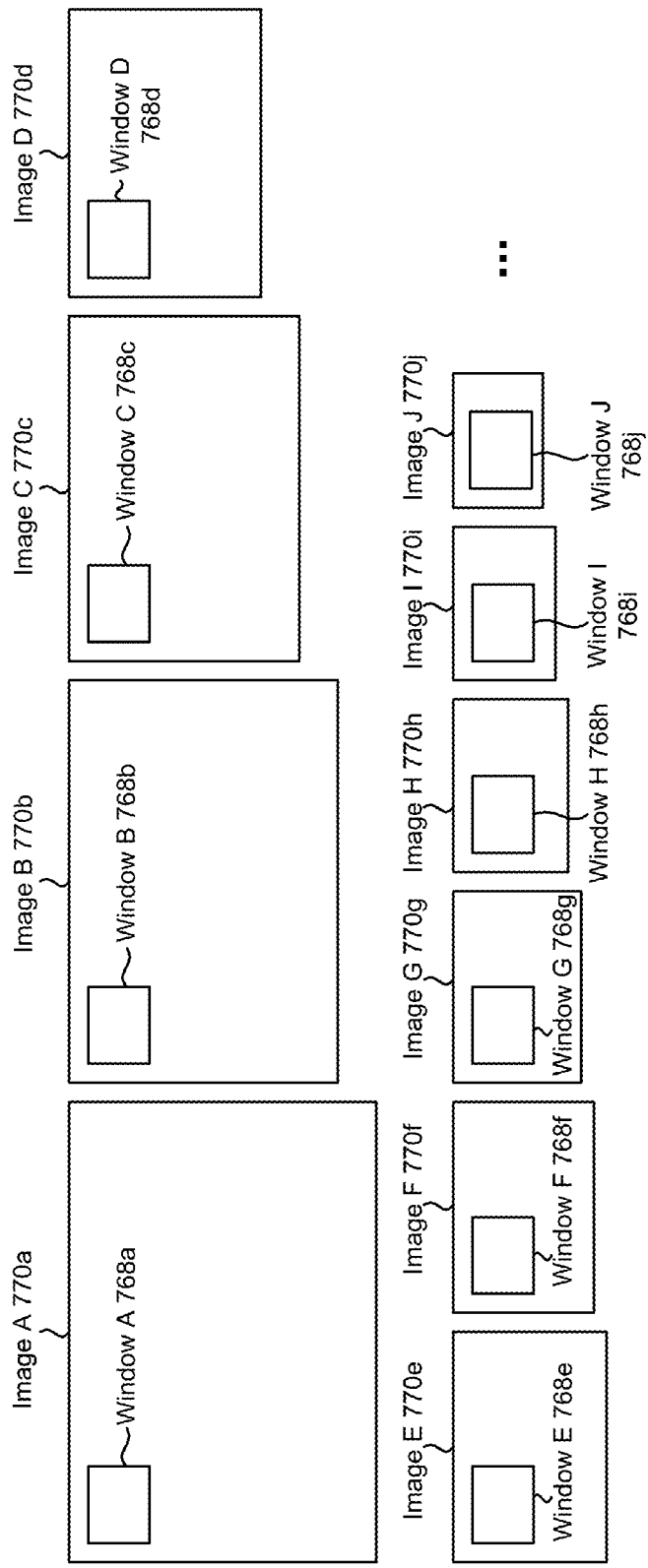
FIG. 7B is a diagram illustrating several example images and windows that may be used with the present systems and methods.

FIG. 7B is a diagram illustrating several example images 770*a-j* and windows 768*a-j* that may be used with the present systems and methods. In particular, FIG. 7B illustrates that different image sizes or scales may be searched, while the window size may remain the same. The approach described in connection with FIG. 7B may be implemented in addition to or alternatively from the approach described in connection with FIG. 7A.

Figure 8:
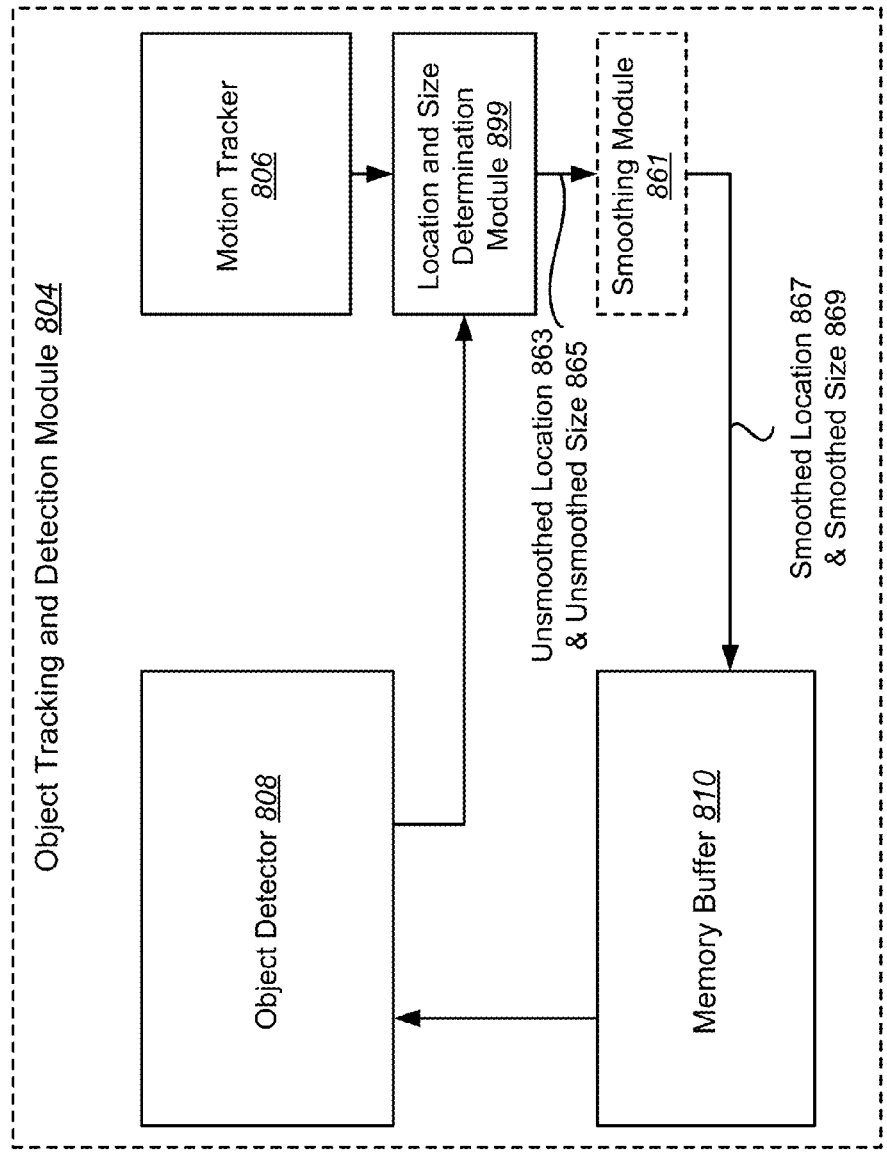
FIG. 8 is a block diagram illustrating another possible configuration of an object tracking and detection module.

FIG. 8 is a block diagram illustrating another possible configuration of an object tracking and detection module 804. The object tracking and detection module 804 illustrated in FIG. 8 may include one or more similar components and perform similar functionality to corresponding components in the object tracking and detection module 204 illustrated in FIG. 2. Specifically, the object tracking and detection module 804 may include an object detector 808, motion tracker 806 and/or a memory buffer 810.

The object tracking and detection module 804 may optionally include a smoothing module 861 that is used to reduce the jittering affect due to target motion and tracking error (causing a search window to have a smoother trajectory in both location (x,y) and size (width, height), for example). The smoothing module 861 can be simple moving average (MA) filters or auto regression (AR) filters. The smoothing degree for the location and size can be different. Predictive filters, such as a Kalman filter may also be suitable for location smoothing. More detail is given in connection with FIG. 9.

The object tracking and detection module 804 may optionally include a location and size determination module 899 that may output the combined result of motion tracking and object detection, which may be represented by a bounding box. This bounding box may include location and/or size information that is/are smoothed by the smoothing module 861. For example, the smoothing module 861 may produce a smoothed location 867 and/or a smoothed size 869 based on an unsmoothed location 863 and an unsmoothed size 865.

Figure 9:
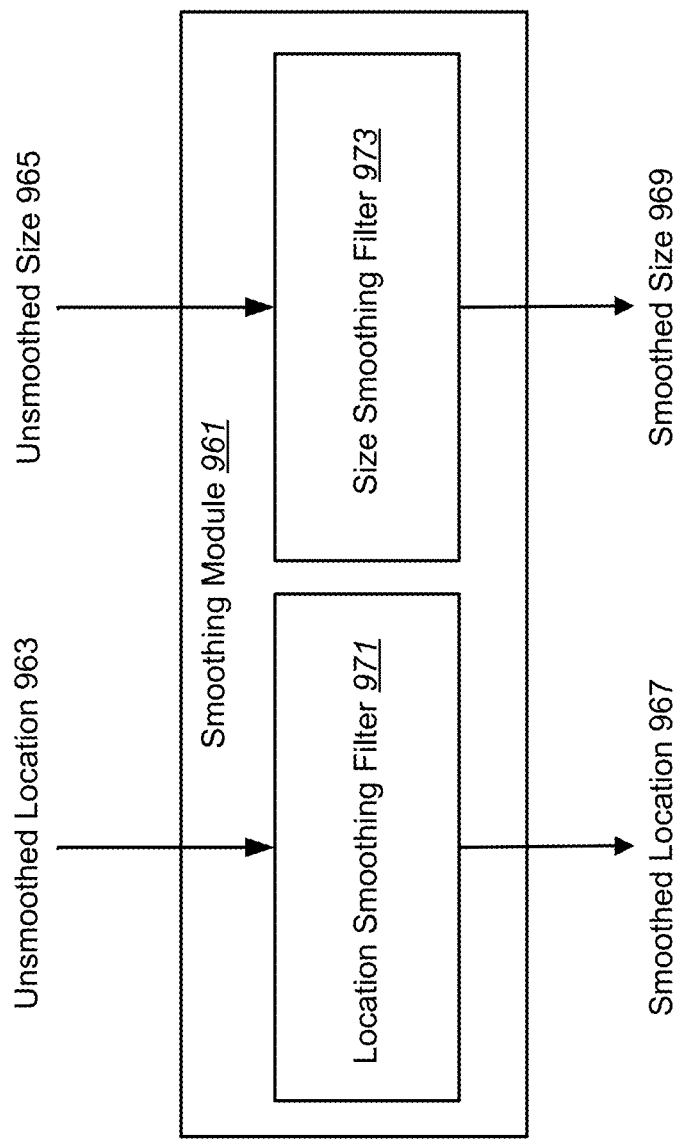
FIG. 9 is a block diagram illustrating a smoothing module.

FIG. 9 is a block diagram illustrating a smoothing module 961. In one configuration, using an auto regression (AR) model, the location smoothing filter 971 and the size smoothing filter 973 may produce a smoothed location 967 and/or a smoothed size 969 based on an unsmoothed location 963 and/or an unsmoothed size 965.

For example, assume X is the variable to be smoothed (either the location or the size) and let X' be the output of X by the object tracker. In this configuration, the smoothed filtering of X at time t, $X_t$, can be described in accordance with $X_t = W*X'_t + (1-W)*X_{t-1}$, where $X'_t$ is the tracker output of X at time t, $X_{t-1}$ is the smoothed result of X at time t−1, and W (0<=W<=1) is a smoothing weight that controls the smoothing effect. For example, $X'_t$ may be a window location or window size selected for a current video frame and $X_{t-1}$ may be a window location or window size used for a previous video frame. A different smoothing weight, W, can be used for the location smoothing filter 971 and the size smoothing filter 973. The selection of smoothing weight may also be adapted based on the detection and tracking confidence value and/or based on a tracking confidence value or a detection confidence value.

Figure 10:
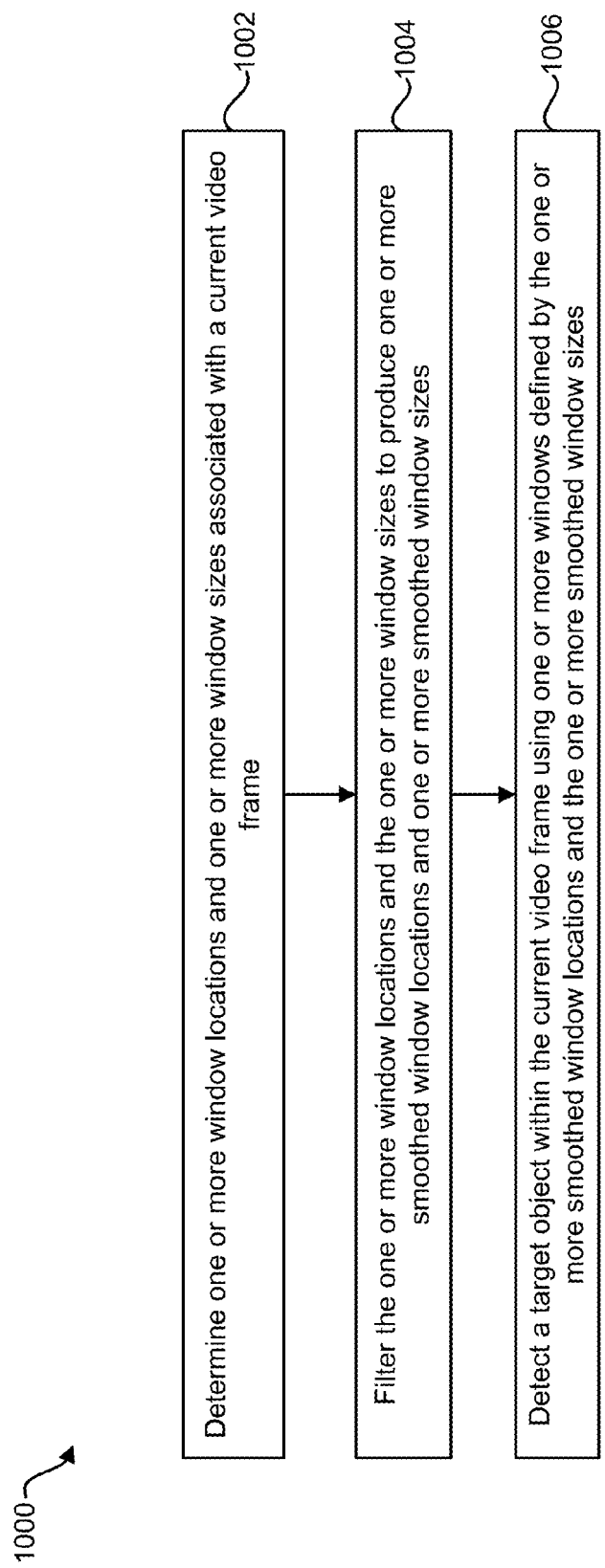
FIG. 10 is a flow diagram illustrating a method for smoothing jitter in motion tracking results.

FIG. 10 is a flow diagram illustrating a method 1000 for smoothing jitter in motion tracking results. The method 1000 may be performed by an electronic device 102, e.g., an object tracking and detection module 804 in an electronic device 102. The electronic device 102 may determine 1002 one or more window locations and one or more window sizes associated with a current video frame, e.g., an unsmoothed location 863 and unsmoothed size 865. The electronic device 102 may also filter 1004 the one or more window locations and the one or more window sizes to produce one or more smoothed window locations 867 and one or more smoothed window sizes 869. For example, this may include using a moving average filter, an auto regression filter or a Kalman filter. In one configuration, in response to low tracking confidence (e.g., the detection and tracking confidence value is below the detection and tracking threshold), the smoothing weights for location and size may be reduced. Alternatively, the smoothing weights may be reduced based on the detection confidence value or the tracking confidence value. The electronic device 102 may also detect 1006 a target object within the current video frame 224 using one or more windows defined by the one or more smoothed window locations 867 and the one or more smoothed sizes 869.

Some configurations of the systems and methods disclosed herein may provide robust object tracking based on local motion patterns and/or global motion patterns. For example, some configurations of the systems and methods disclosed herein may improve tracking quality by using the differences in local and global motion. Motion may provide a cue for object tracking. However, motion from a cluttered background may present a challenge to the object tracker as it may distort motion estimation. Since the object of interest may move in a way that is different from the background, difference in motion between the object and its background may be beneficially utilized. Motion patterns may not only be used by themselves for tracking, but may also augment tracking methods and improve their performance.

In some configurations, the systems and methods disclosed herein may estimate the likelihood of an object's position within a tracking region of interest (ROI) using differences between the local and global motion. Local motion may be the motion of content (e.g., foreground) within a region of interest between frames. For example, local motion may indicate the movement of content in a region of interest from a first frame to a second frame. Global motion may be the motion of content (e.g., all content or the content in general) between frames. Differences between the local and global motion may be measured as a degree of relative motion between the region of interest and the whole image. By separating foreground and background motion, the systems and methods disclosed herein may reduce the chance of the tracker getting distracted by background clutter. Using local motion information may help in maintaining a tighter region of interest (e.g., bounding region, bounding box, etc.) around the object, and may prevent the region of interest from expanding unnecessarily and/or losing track of the object. For example, object tracking may be lost if the region of interest expands too much. By computing weights based on the difference between local motion and global motion, both scale and translation of the object between frames may be estimated concurrently (e.g., simultaneously). Temporal and/or spatial smoothing may be applied to the weights to reduce and/or remove any outliers or noise. Some configurations of the systems and methods disclosed herein may be computationally light, and hence may be performed in real time. Additionally or alternatively, the systems and methods disclosed herein may be performed alongside other tracking methods to facilitate robust tracking.

Figure 11:
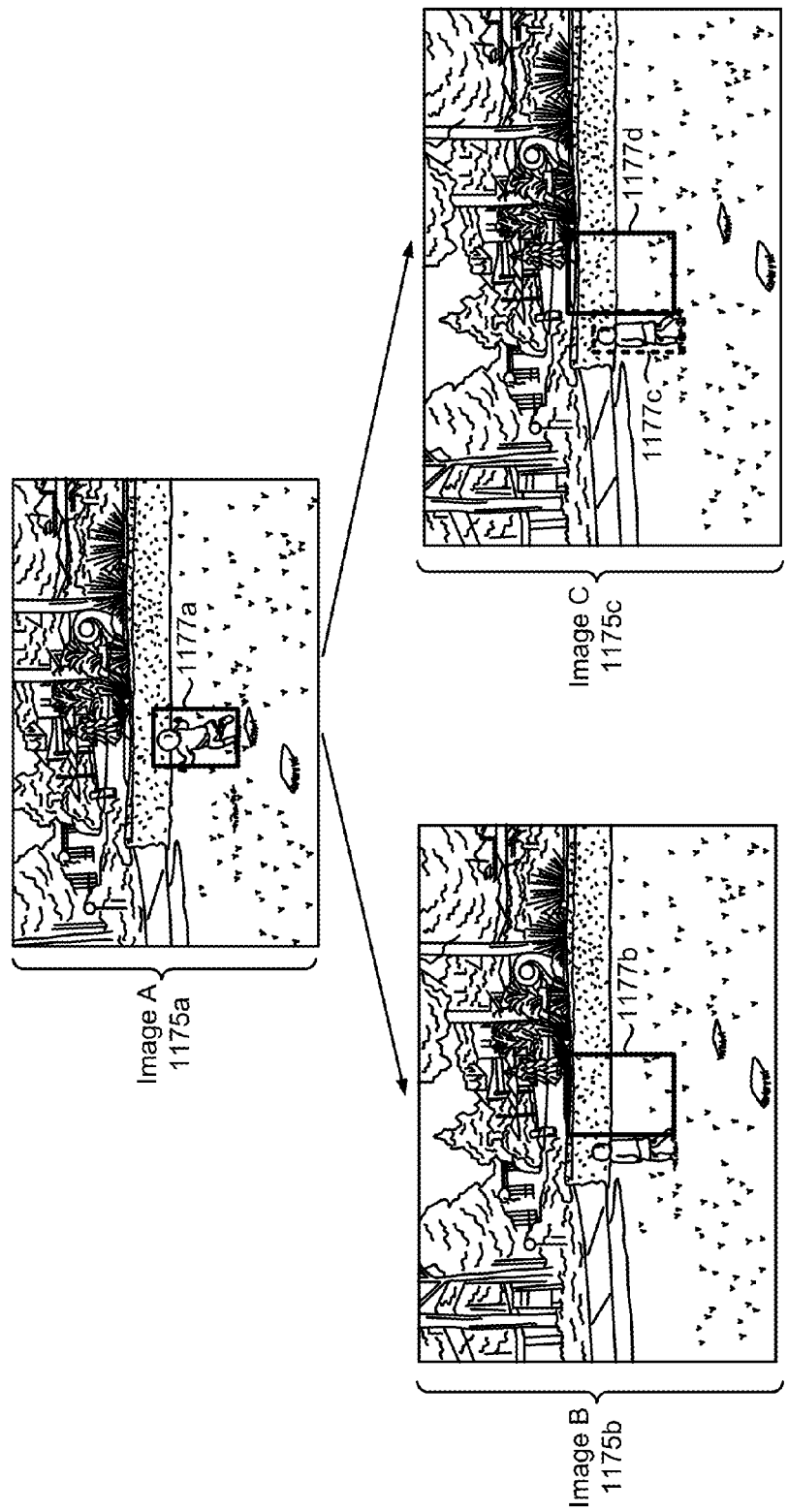
FIG. 11 is a diagram illustrating one example of object motion in an image.

FIG. 11 is a diagram illustrating one example of object motion in an image. In particular, Image A 1175*a* illustrates an initial tracking region of interest (ROI) 1177*a*. The ROI 1177*a* in this example is a bounding box around a child. Some trackers may have certain limitations. For example, tracking may get attached to certain background regions, thereby losing track. The bounding box may grow during such situations. An example of this situation is illustrated in Image B 1175*b* (e.g., the result of a tracker). As can be observed, the position of the child has changed, and the ROI 1177*b* has gotten attached to the background, thereby losing track of the child and expanding the size of the ROI 1177*b*. Some trackers may additionally or alternatively have difficulties in tracking objects that move towards or away from the camera. Desirable tracker behavior is illustrated in Image C 1175*c*, where the tracker maintains track (and does not get attached to the background, for example). In particular, Image C 1175*c* illustrates an ROI 1177*c* that has continued to track the child in comparison with an expanded ROI 1177*d* that has lost track.

Figure 12:
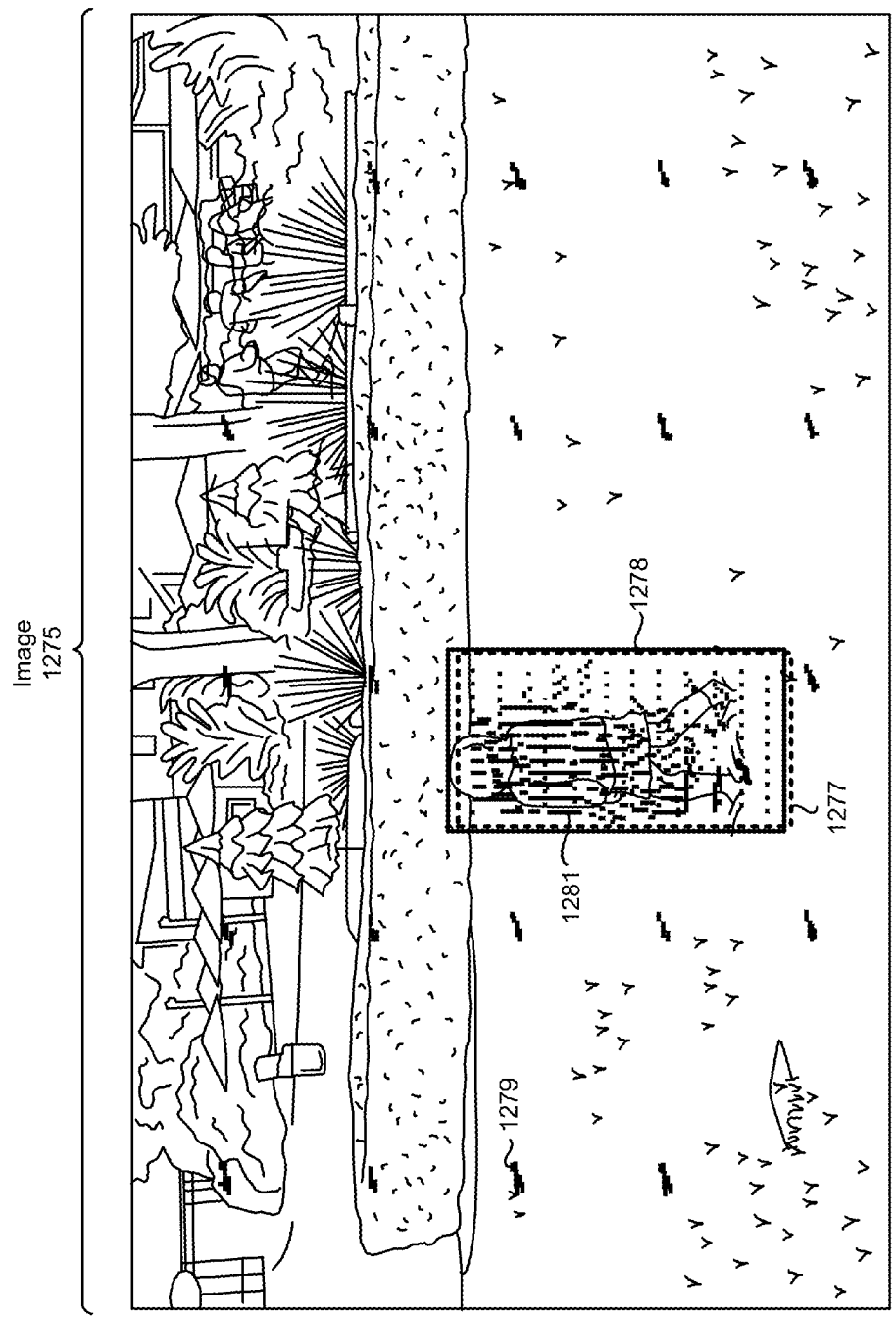
FIG. 12 is a diagram illustrating an example of an image, a set of global motion vectors, a region of interest, a subsequent region of interest, and a set of local motion vectors.

FIG. 12 is a diagram illustrating an example of an image 1275, a set of global motion vectors 1279, a region of interest 1278, a subsequent region of interest 1277, and a set of local motion vectors 1281. An object of interest may exhibit a motion pattern (e.g., local motion) that is different from the surroundings. This cue may be used to reliably distinguish the object from its surroundings. Accordingly, it may be beneficial to have a reliable way of comparing the local and global motions and separating them for robust tracking.

Specifically, FIG. 12 illustrates a set of local motion vectors 1281 inside of the region of interest 1278 (e.g., bounding box). In this example, the set of local motion vectors includes 144 local motion vectors 1281 (e.g., a grid of 12×12 local motion vectors 1281 within the region of interest 1278).

A set of global motion vectors 1279 is also illustrated as spread over the frame. In this example, the set of global motion vectors includes 25 global motion vectors 1279 (e.g., a grid of 5×5 global motion vectors 1279). The object of interest (e.g., the child) may be tracked to a subsequent frame. For example, the subsequent region of interest 1277 (e.g., a region of interest corresponding to a subsequent frame) may be predicted based on the local motion vectors 1281.

Figure 13:
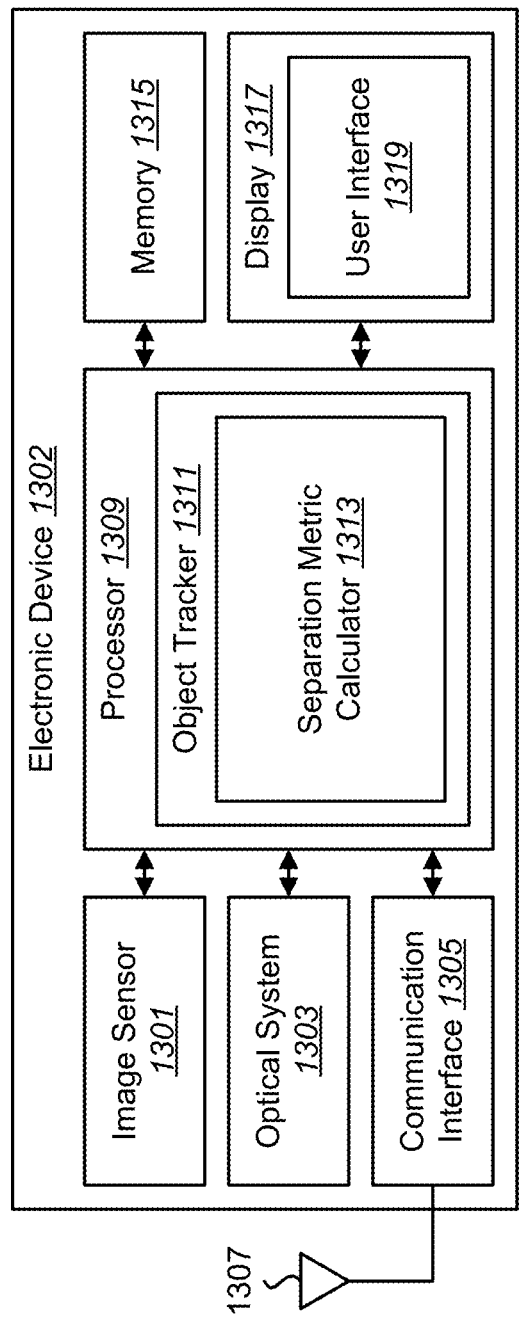
FIG. 13 is a block diagram illustrating one example of an electronic device in which systems and methods for object tracking may be implemented.

FIG. 13 is a block diagram illustrating one example of an electronic device 1302 in which systems and methods for object tracking may be implemented. Examples of the electronic device 1302 include cameras, video camcorders, digital cameras, cellular phones, smart phones, computers (e.g., desktop computers, laptop computers, etc.), tablet devices, media players, televisions, automobiles, personal cameras, action cameras, surveillance cameras, mounted cameras, connected cameras, robots, aircraft, drones, unmanned aerial vehicles (UAVs), smart applications, healthcare equipment, gaming consoles, personal digital assistants (PDAs), set-top boxes, etc. The electronic device 1302 may include one or more components or elements. One or more of the components or elements may be implemented in hardware (e.g., circuitry) or a combination of hardware and software (e.g., a processor with instructions).

In some configurations, the electronic device 1302 may include a processor 1309, a memory 1315, a display 1317, an image sensor 1301, an optical system 1303, and/or a communication interface 1305. The processor 1309 may be coupled to (e.g., in electronic communication with) the memory 1315, display 1317, image sensor 1301, optical system 1303, and/or communication interface 1305.

In some configurations, the electronic device 1302 may perform one or more of the functions, procedures, methods, steps, etc., described in connection with one or more of FIGS. 1-12. Additionally or alternatively, the electronic device 1302 may include one or more of the structures described in connection with one or more of FIGS. 1-12. In some configurations, the object tracking described in connection with FIG. 13 may be implemented in conjunction with one or more of the image scanning, object detection and/or object tracking approaches described in connection with one or more of FIGS. 1-12. It should be noted that the object tracking described in connection with FIG. 13 may be implemented in addition to or alternately from one or more of the approaches to image scanning and/or object tracking described in connection with one or more of FIGS. 1-12. For example, the object tracker 1311 described in connection with FIG. 13 may be implemented in one or more of the electronic devices described above in addition to or instead of the tracking described in connection with one or more of the object tracking and detection modules 104,204,804.

The communication interface 1305 may enable the electronic device 1302 to communicate with one or more other electronic devices. For example, the communication interface 1305 may provide an interface for wired and/or wireless communications. In some configurations, the communication interface 1305 may be coupled to one or more antennas 1307 for transmitting and/or receiving radio frequency (RF) signals. Additionally or alternatively, the communication interface 1305 may enable one or more kinds of wireline (e.g., Universal Serial Bus (USB), Ethernet, etc.) communication.

In some configurations, multiple communication interfaces 1305 may be implemented and/or utilized. For example, one communication interface 1305 may be a cellular (e.g., 3G, Long Term Evolution (LTE), CDMA, etc.) communication interface 1305, another communication interface 1305 may be an Ethernet interface, another communication interface 1305 may be a universal serial bus (USB) interface, and yet another communication interface 1305 may be a wireless local area network (WLAN) interface (e.g., 802.11 interface).

The electronic device 1302 may obtain one or more images (e.g., digital images, image frames, video, etc.). For example, the electronic device 1302 may include the image sensor 1301 and the optical system 1303 (e.g., lenses) that focuses images of objects that are located within the field of view of the optical system 1303 onto the image sensor 1301. In some configurations, the image sensor 1301 may capture the one or more images. The optical system 1303 may be coupled to and/or controlled by the processor 1309. Additionally or alternatively, the electronic device 1302 may request and/or receive the one or more images from another device (e.g., an external image sensor coupled to the electronic device 1302, a network server, traffic camera, drop camera, automobile camera, web camera, etc.). In some configurations, the electronic device 1302 may request and/or receive the one or more images via the communication interface 1305. For example, the electronic device 1302 may or may not include a camera (e.g., an image sensor 1301 and/or optical system 1303) and may receive images from a remote device. One or more of the images (e.g., image frames) may include an object (e.g., a target object for detection and/or tracking).

In some configurations, the electronic device 1302 may include an image data buffer (not shown). The image data buffer may buffer (e.g., store) image data from the image sensor 1301. The buffered image data may be provided to the processor 1309.

In some configurations, the electronic device 1302 may include a camera software application and/or a display 1317. When the camera application is running, images of objects that are located within the field of view of the optical system 1303 may be captured by the image sensor 1301. The images that are being captured by the image sensor 1301 may be presented on the display 1317. In some configurations, these images may be displayed in rapid succession at a relatively high frame rate so that, at any given moment in time, the objects that are located within the field of view of the optical system 1303 are presented on the display 1317. The one or more images obtained by the electronic device 1302 may be one or more video frames and/or one or more still images. In some configurations, the display 1317 may present additional or alternative information. For example, the display 1317 may present one or more regions of interest (e.g., bounding boxes) corresponding to one or more tracked objects.

The processor 1309 may include and/or implement an object tracker 1311. In some configurations, the processor 1309 may be an example of the processor 264 described in connection with FIG. 2. Additionally or alternatively, the object tracker 1311 may be an example of one or more of the motion trackers 106, 206, 806 described herein. One or more of the image frames may be provided to the object tracker 1311. The object tracker 1311 may track an object in one or more image frames. For example, the object tracker 1311 may track an object based on a separation metric. In some configurations, the object tracker 1311 may operate in accordance with one or more of the approaches, functions, procedures, steps and/or structures described in connection with one or more of FIGS. 14-19. The object tracker 1311 may produce tracking results. The tracking results may indicate an estimated and/or predicted location of an object in an image. For example, the tracking results may indicate an object position (e.g., one or more pixels of an object), an object boundary (e.g., edge), a region of interest (e.g., bounding box) that includes part or all of an object, etc.

The object tracker 1311 may determine a local motion pattern. The local motion pattern may be a set of (two or more) local motion vectors. A local motion vector may be a motion vector corresponding to a point within a region of interest (e.g., bounding box). For example, determining the local motion pattern may include determining a set of local motion vectors within a region of interest between a previous frame and a current frame. In some configurations, the local motion vectors may correspond only to points (e.g., pixels) within a region of interest between frames. Accordingly, a local motion pattern may include only motion vectors within a region of interest in some configurations. Thus, the local motion pattern may characterize the motion of one or more points within the region of interest. In some configurations, the local motion vectors may be computed using optical flow. It should be noted that the local motion pattern may not be based on feature points in some configurations.

The object tracker 1311 may determine a global motion pattern. The global motion pattern may be a set of (two or more) global motion vectors. A global motion vector may be a motion vector corresponding to a point in the image. A global motion vector may not be limited to points within the region of interest. For example, a global motion vector may or may not correspond to a point within the region of interest. Determining the global motion pattern may include determining a set of global motion vectors between a previous frame and a current frame. In some configurations, the global motion pattern may include at least one global motion vector that is outside of the region of interest. The global motion pattern may characterize the general motion of one or more points in the image. In some configurations, the global motion vectors may be computed using optical flow.

In some configurations, the global motion pattern may span a larger area than the local motion pattern. Additionally or alternatively, the global motion pattern may include fewer motion vectors than the local motion pattern. For example, the global motion pattern may be less dense (e.g., include fewer motion vectors over a wider area) in comparison with the local motion pattern (which may include more motion vectors over a smaller area (e.g., the region of interest), for instance). Additionally or alternatively, the local motion pattern and the global motion pattern may be determined independently. For example, the global motion pattern may be calculated separately from the local motion pattern.

A motion vector may be a vector that indicates the motion (e.g., movement, displacement, shift, etc.) of a point or area between images. For example, the object tracker 1311 may compare a previous frame and a current frame to determine the motion of one or more points (e.g., areas) of an image. The motion of the one or more points may come as a result of the motion of an image sensor 1301 relative to its surroundings and/or as a result of the motion of an object relative to the image sensor 1301. It should be noted that motion vectors may be computed in a forward sequence and/or in a backward sequence. For example, the object tracker 1311 may generate a motion vector for a point starting at a first (e.g., previous) frame and progressing to a second (e.g., current) frame. Additionally or alternatively, the object tracker 1311 may generate a motion vector for a point starting at the second (e.g., current) frame and progressing to a first (e.g., previous) frame.

In some configurations, the object tracker 1311 may include a separation metric calculator 1313. Alternatively, the separation metric calculator 1313 may be separate from the object tracker 1311. The separation metric calculator 1313 may calculate a separation metric based on the local motion pattern and the global motion pattern. The separation metric may be a measure of a degree of relative motion between the region of interest (e.g., a tracked object) and the whole image. For example, the separation metric may indicate a motion difference between the local motion pattern and the global motion pattern. More specific examples of calculating a separation metric are given in connection with FIGS. 15 and 17.

In some configurations, calculating the separation metric may include fitting the global motion pattern to a global motion model and calculating fitting errors between the global motion model and the local motion pattern. The global motion model may include at least one statistical measure of the global motion pattern. For example, the global motion model may be based on one or more statistical distribution measures (e.g., mean, median ($\lambda^G$), standard deviation ($\sigma^G$), etc.) of the global motion pattern. For instance, the separation metric may be based on one or more statistical distribution measures (e.g., mean, median, standard deviation, etc.) of the global motion pattern (e.g., global motion vectors).

In some configurations, the processor 1309 may calculate a foreground weight map based on the separation metric. For example, the foreground weight map may help separate the local motion vectors corresponding to an object of interest (e.g., foreground) from local motion vectors corresponding to background. In some approaches, the processor 1309 may smooth the foreground weight map over time. An example of smoothing a foreground weight map is given in connection with FIG. 18. The foreground weight map may indicate weights corresponding to each local motion vector (in the region of interest, for example). An example of a foreground weight map is given in connection with FIG. 17. Additionally or alternatively, the processor 1309 may refine the foreground weight map over space. For example, refining the foreground weight map over space may include multiplying the foreground weight map by a centrally weighted kernel. An example of multiplying the foreground weight map by a centrally weighted kernel is given in connection with FIG. 18. In some configurations, the processor 1309 may smooth a historical weight map over time. An example of smoothing a historical weight map over time is given in connection with FIG. 18.

In some configurations, the processor 1309 may preprocess the local motion vectors and/or the global motion vectors. For example, the processor 1309 may reject one or more unreliable motion vectors (e.g., unreliable local motion vector(s), unreliable global motion vector(s), or both). In some approaches, the processor 1309 may run a forward optical flow and a backward optical flow to obtain motion vectors. The processor 1309 may measure a distance error between the (forward and backward generated) motion vectors. Those motion vectors that do not meet one or more criteria (e.g., that are in a percentile range, that have greater than a distance error threshold, etc.) may be rejected (e.g., discarded, removed from the motion vector set, not utilized in subsequent computation, etc.). An example of preprocessing the local motion vectors and/or the global motion vectors is given in connection with FIG. 15.

In some configurations, the processor 1309 may check global motion consistency. For example, the processor 1309 may determine a global motion consistency measure that indicates a degree to which the image is moving consistently. For instance, the global motion consistency measure may indicate how much of an image is (e.g., how many or what proportion of global motion vectors are) moving in a similar direction (e.g., within a range of directions). An example of calculating a global consistency measure is given in connection with FIG. 15. In some configurations, the processor 1309 may determine whether the global motion consistency measure meets one or more consistency criteria (e.g., a motion consistency condition, a motion consistency amount, a motion consistency range, a motion consistency threshold, etc.). For example, the processor 1309 may perform motion estimation differently based on whether the global motion consistency measure meets the one or more criteria.

In some approaches, the global motion consistency measure may be utilized to determine which motion vectors are used for motion estimation. For example, only selected motion vectors may be used for motion estimation in the case that the global motion consistency measure meets the one or more criteria. In cases where the global motion consistency measure does not meet the one or more criteria, all motion vectors may be utilized for motion estimation (all original motion vectors or motion vectors remaining after removing unreliable motion vectors, for example).

The object tracker 1311 may track an object based on the separation metric. For example, the object tracker 1311 may track the object based on a selected set of motion vectors. For instance, the separation metric may be utilized to select motion vectors that correspond to an object of interest. For example, the separation metric may indicate which motion vectors correspond to an object of interest in the foreground (rather than motion vectors that correspond to the background).

In some configurations, tracking the object may include performing motion estimation based on one or more motion vectors. For example, the object tracker 1311 may perform motion estimation based on the selected set of motion vectors or all motion vectors. In some configurations, the object tracker 1311 may estimate region of interest (e.g., object) scale, shift (e.g., translation), and/or rotation. For example, the object tracker 1311 may utilize a weighted least squares approach to estimating region of interest (e.g., object) scale, shift and/or rotation. In some configurations, the object tracker 1311 may predict a region of interest (e.g., bounding box) based on the motion estimation. For example, the object tracker 1311 may generate a region of interest in a subsequent frame corresponding to the motion estimation. In some configurations, the object tracker 1311 may track the object in accordance with one or more of the approaches described in connection with one or more of FIGS. 1-6 and 8.

It should be noted that the electronic device 1302 may be configured to perform one or more operations based on the object tracking in some configurations. For example, the processor 1309 may optionally include and/or implement an object recognizer, an object remover, an image enhancer, a cropper, a compressor and/or a focuser.

In some configurations, the object recognizer may recognize an object based on the object tracking. In some configurations, object recognition may include comparing information (e.g., landmarks, features, etc.) from a region of interest with a database of objects. If the object matches an object in the database (to a degree of probability, for example), then the object is recognized. For example, a face in a region of interest may be compared to a database of known faces. If the face in the region of interest matches a face in the database, the face is recognized. For example, the database may include names of people corresponding to the faces. Accordingly, a face may be recognized to identify a person. Object recognition may be performed on other objects (e.g., eyes, buildings, street signs, people, roads, text, etc.).

In some configurations, the object remover may remove an object from an image based on the object tracking. For example, the object remover may remove an object included in a region of interest by filling in the object area with image patches from areas outside of the region of interest.

In some configurations, the image enhancer may enhance the quality and/or properties of the image based on the object tracking. For example, the image enhancer may perform color correction, color adjustment, white balance, contrast enhancement, de-hazing, red eye removal, sharpness adjustment, noise reduction, lens correction, filtering, image merging, object highlighting and/or image distortion (e.g., warping). Enhancing the image may include modifying pixels inside of and/or outside of the subset of the plurality of region(s) of interest.

In some configurations, the cropper may crop the image based on the object tracking. For example, the cropper may crop pixels outside of the region(s) of interest or pixels outside of the region(s) of interest with a margin.

In some configurations, the compressor may compress the image based on the object tracking. For example, the compressor may compress pixels outside of the region(s) of interest or pixels outside of the region(s) of interest with a margin. This may allow for maintaining image fidelity in one or more areas (e.g., regions of interest) that include objects of interest while allowing the remainder of the image to be compressed to reduce the data size of the image.

In some configurations, the focuser may focus the optical system 1303 based on the object tracking. For example, the focuser may utilize the image within one or more regions of interest as a reference to focus the optical system 1303. This may allow one or more objects within the one or more regions of interest to be in focus.

In some configurations, the processor 1309 may optionally be coupled to, be part of (e.g., be integrated into), include and/or implement an advanced driving assistance system (ADAS). For example, the object tracker 1311 may track one or more objects (e.g., pedestrians, vehicles, etc.).

The processor 1309 (and/or the ADAS) may utilize the tracking to perform one or more operations. For example, the tracking may be utilized to detect potential collisions and/or to perform an action (e.g., present one or more tracked objects on a display (e.g., display panel, projector, etc.), output a warning light and/or sound, activate and/or control braking, control steering, activate and/or control a vehicle horn, activate and/or control emergency flashers, activate and/or control one or more vehicle lights (e.g., headlights, taillights, fog lights, etc.), etc.

The memory 1315 may store instructions and/or data. The processor 1309 may access (e.g., read from and/or write to) the memory 1315. Examples of instructions and/or data that may be stored by the memory 1315 may include image data, motion vectors, weights, weight map(s), separation metric(s), object tracker instructions, and/or separation metric calculator instructions, etc.

In some configurations, the electronic device 1302 may present a user interface 1319 on the display 1317. For example, the user interface 1319 may enable a user to interact with the electronic device 1302. In some configurations, the user interface 1319 may enable a user to indicate an object that is desired for tracking.

In some configurations, the display 1317 may be a touchscreen that receives input from physical touch (by a finger, stylus or other tool, for example). For instance, the touchscreen may be an input interface that receives touch input indicating an object for tracking. Additionally or alternatively, the electronic device 1302 may include or be coupled to another input interface. For example, the electronic device 1302 may include a camera facing a user and may detect user gestures (e.g., hand gestures, arm gestures, eye tracking, eyelid blink, etc.) for indicating an object for tracking. In another example, the electronic device 1302 may be coupled to a mouse and may detect a mouse click indicating an object for tracking.

It should be noted that no user input may be necessary in some configurations. For example, the electronic device 1302 may automatically detect and/or track one or more objects in the one or more images.

Figure 14:
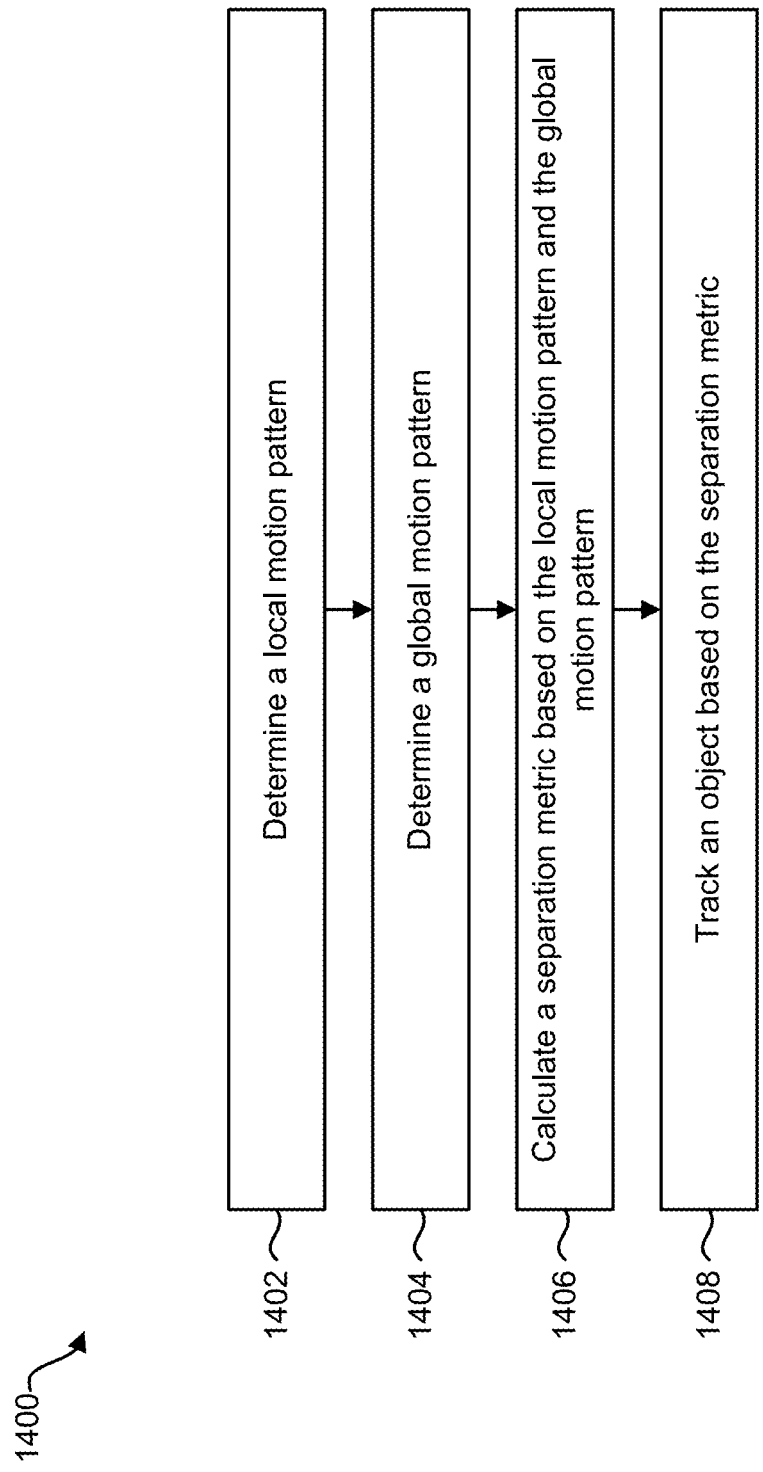
FIG. 14 is a flow diagram illustrating one configuration of a method for object tracking.

FIG. 14 is a flow diagram illustrating one configuration of a method 1400 for object tracking. The method 1400 may be performed by one or more of the electronic devices 102, 1302 described herein, for example.

The electronic device 1302 may determine 1402 a local motion pattern. This may be accomplished as described in connection with one or more of FIGS. 13 and 15-16, for example.

The electronic device 1302 may determine 1404 a global motion pattern. This may be accomplished as described in connection with one or more of FIGS. 13 and 15-16, for example.

The electronic device 1302 may calculate 1406 a separation metric based on the local motion pattern and the global motion pattern. This may be accomplished as described in connection with one or more of FIGS. 13 and 15-16, for example.

The electronic device 1302 may track 1408 an object based on the separation metric. For example, this may be accomplished as described in connection with one or more of FIGS. 1-6, 8, 13 and 15. In some configurations, the electronic device 1302 may utilize the separation metric to obtain a foreground weight map. The electronic device 1302 may estimate motion based on the foreground weight map (e.g., based on weighted motion vectors, based on W, $W_f$, $W_s$, and/or W', etc.). The electronic device 1302 may predict a region of interest based on the motion estimation to track 1408 the object.

Figure 15:
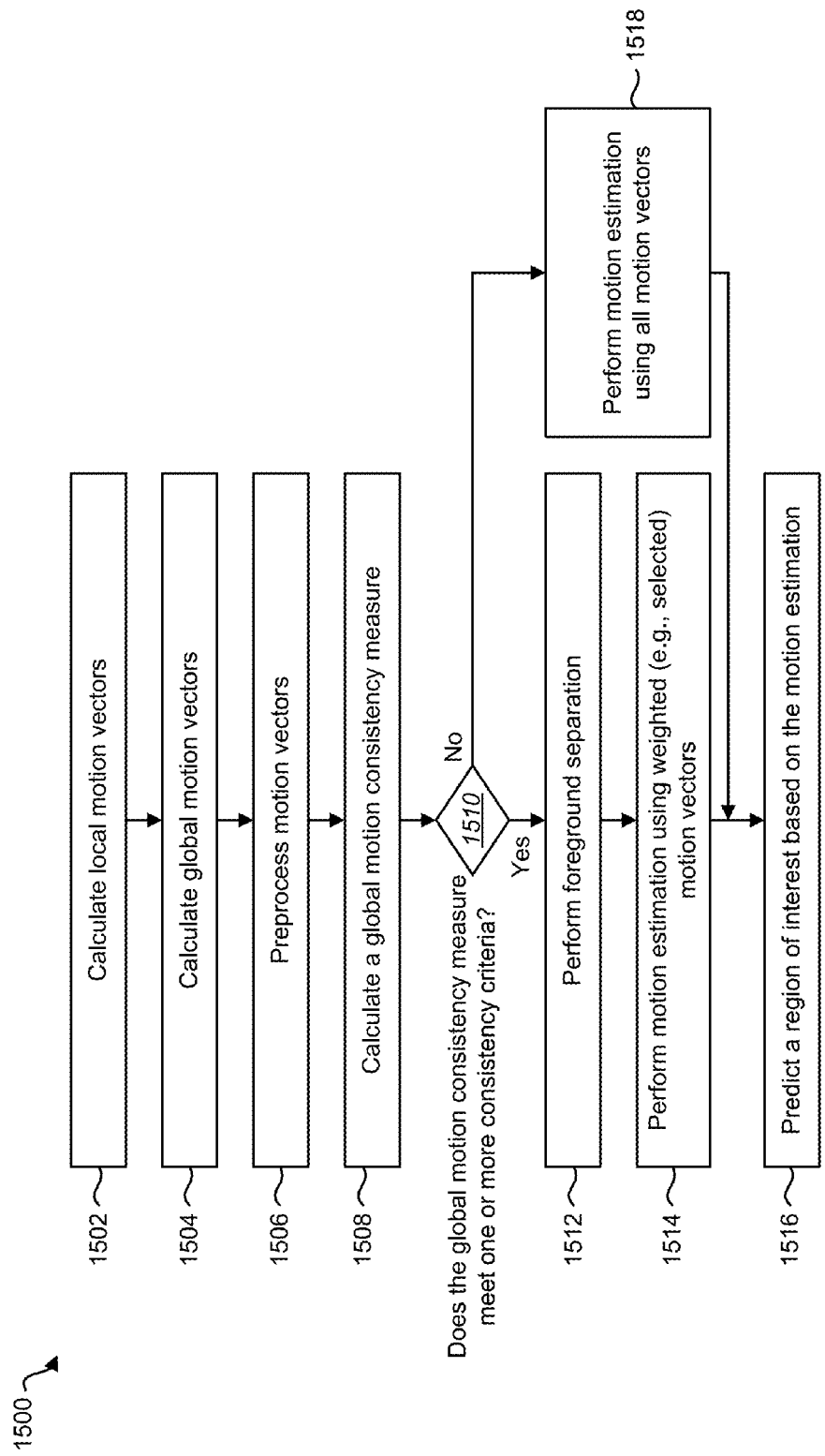
FIG. 15 is a flow diagram illustrating a more specific configuration of a method for tracking an object.

FIG. 15 is a flow diagram illustrating a more specific configuration of a method 1500 for tracking an object. For example, the electronic device 1302 described in connection with FIG. 13 may operate in accordance with one or more of the functions, steps, procedures and/or structures described in connection with FIG. 15. Specifically, the electronic device 1302 may perform the method 1500 described in connection with FIG. 15 in some configurations. Additionally or alternatively, the method described in connection with FIG. 15 may be a more specific example of the method 1400 described in connection with FIG. 14.

Figure 16:
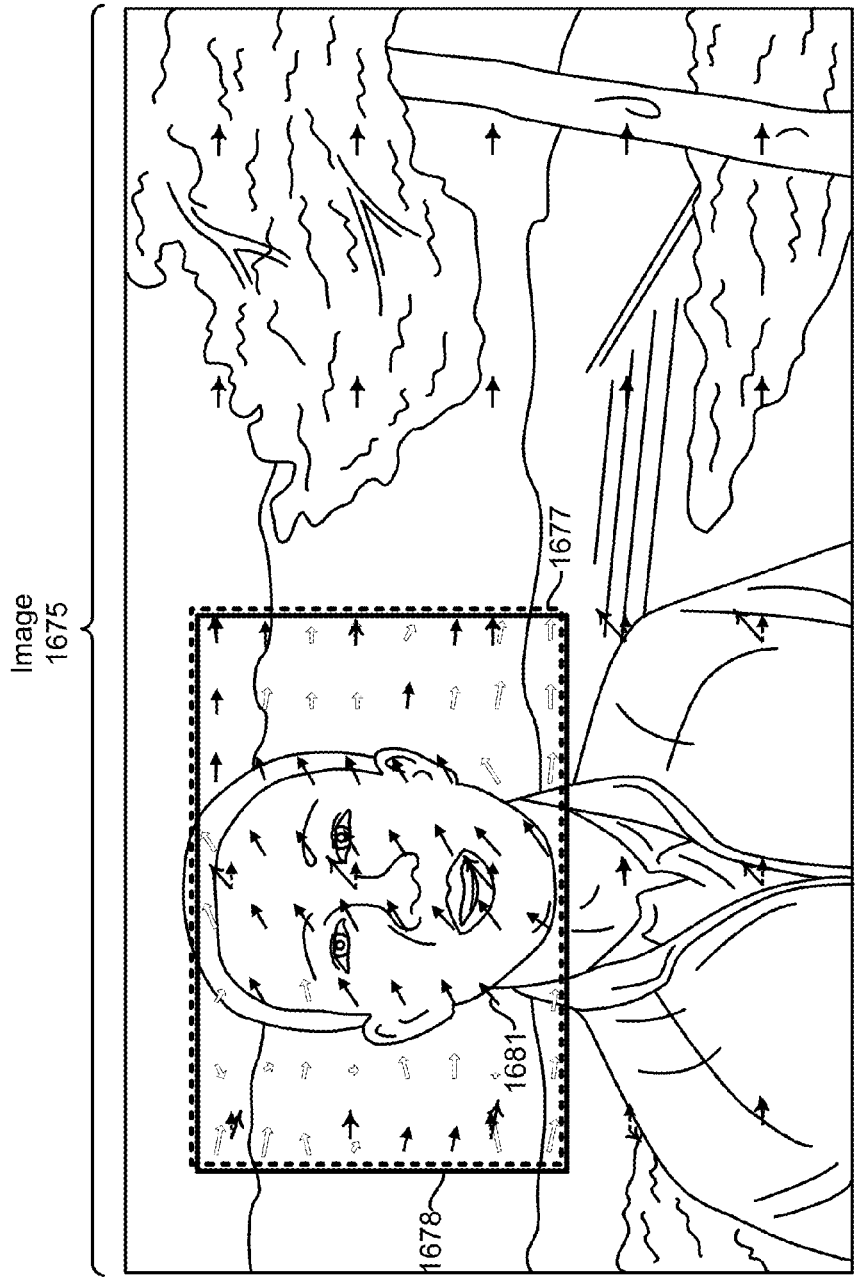
FIG. 16 is a diagram illustrating an example of an image, a set of global motion vectors, a region of interest, a subsequent region of interest, and a set of local motion vectors.

An electronic device 1302 may calculate 1502 location motion vectors. This may be accomplished as described above in connection with FIG. 13. For example, an electronic device 1302 may calculate one or more local motion vectors within a region of interest between a previous frame and a current frame. In some configurations, calculating 1502 the local motion vectors may be accomplished using optical flow. FIG. 16 illustrates examples of local motion vectors.

A set of local motion vectors may be an example of a local motion pattern. As described above, local motion vectors may be motion vectors that are within a region of interest. For example, determining a local motion pattern may include determining a set of local motion vectors within a region of interest between a previous frame and a current frame. In some configurations, the electronic device 1302 may calculate local motion vector(s) with a forward trajectory and/or a backward trajectory. This may be accomplished in accordance with the method 500 described in connection with FIG. 5, for example.

The electronic device 1302 may calculate 1504 global motion vectors. This may be accomplished as described above in connection with FIG. 13. For example, an electronic device 1302 may calculate 1504 one or more global motion vectors between a previous frame and a current frame. In some configurations, calculating 1504 the global motion vectors may be accomplished using optical flow. FIG. 16 illustrates examples of global motion vectors.

A set of global motion vectors may be an example of a global motion pattern. As described above, global motion vectors may be motion vectors that are distributed over a frame. For example, determining a global motion pattern may include determining a set of global motion vectors between a previous frame and a current frame. The set of global motion vectors may span a larger area than the local motion vectors. Additionally or alternatively, one or more of the global motion vectors may not be included in the region of interest. It should be noted that one or more global motion vectors may be included within the region of interest.

The electronic device 1302 may preprocess 1506 motion vectors. For example, the electronic device 1302 may preprocess 1506 one or more local motion vectors and/or one or more global motion vector(s). Preprocessing 1506 motion vectors may include determining and/or rejecting (e.g., discarding, removing, etc.) unreliable motion vectors. In some configurations, rejecting (e.g., discarding, removing, not utilizing, etc.) one or more unreliable motion vectors may include setting the one or more unreliable motion vectors to 0 and/or removing them from a set of motion vectors (e.g., from the set of local motion vectors).

As described above, a forward trajectory and a backward trajectory may be determined for one or more motion vectors (e.g., one or more local motion vectors and/or one or more global motion vectors). Preprocessing 1506 the motion vectors may include measuring a distance error (e.g., a forward-backward error) between the forward trajectory and the backward trajectory. The distance error (e.g., forward-backward error) may be a distance between the forward trajectory and the backward trajectory. In some configurations, the electronic device 1302 may determine the distance error as a Euclidean distance between the initial point of the forward trajectory and the end point of the backward trajectory. In some configurations, one or more of the motion vectors may be rejected based on the distance error. For example, a proportion of motion vectors (e.g., local motion vectors having a distance error in a percentile) may be rejected and/or one or more motion vectors with an amount of distance error (e.g., with a distance error above a threshold) may be rejected. For instance, local motion vectors having a distance error in the top 20th percentile may be rejected. It should be noted that other proportions may be utilized (e.g., 25th percentile, 50th percentile, etc.). Additionally or alternatively, motion vectors (e.g., local motion vectors) having a distance error below a percentile (e.g., below the $80^{th}$ percentile) may be kept. In some configurations, preprocessing may be performed as described in connection with FIG. 16.

The electronic device 1302 may calculate 1508 a global motion consistency measure. This may be accomplished as described above in connection with FIG. 13. The global motion consistency may be a measure of how consistent the motion is over the global motion vectors.

In some configurations, calculating 1508 the global motion consistency may be performed in accordance with the following equations. Notation is provided here for convenience. Global motion vectors may be denoted $M^G=(m_{xi}^G, m_{yi}^G)$, where $m_{xi}^G$ is a horizontal motion component, $m_{yi}^G$ is a vertical motion component, and $i \in [0, N^G)$. $N^G$ denotes the total number of global motion vectors.

In some configurations, the electronic device 1302 may determine one or more statistical measures of the global motion pattern (e.g., global motion vectors). For example, the electronic device 1302 may determine (e.g., calculate) one or more statistical distribution measures (e.g., average, mean, median, standard deviation, etc.) of the global motion pattern (e.g., global motion vectors). A median of global motion may be denoted $\lambda^G=(\lambda_x^G, \lambda_y^G)$, where $\lambda_x^G$ is a median of the horizontal components of the global motion vectors and $\lambda_y^G$ is a median of the vertical components of the global motion vectors. Alternatively, a mean may be similarly defined. A standard deviation of global motion may be denoted $\sigma^G=(\sigma_x^G, \sigma_y^G)$ where $\sigma_x^G$ is a standard deviation of the horizontal components of the global motion vectors and $\sigma_y^G$ is a standard deviation of the vertical components of the global motion vectors.

One approach to calculating 1508 the global motion consistency measure may be given as follows. In this approach, the electronic device 1302 may determine a number of global motion vectors that are within two standard deviations of the global median (or mean). For each motion vector pair $M^G$, for example, the electronic device 1302 may calculate 1508 the global motion consistency measure as $$\frac{\sum_{i=0}^{N^G} V_i}{N^G}, \text{ where } V_i = \begin{cases} 1, & (M_i^G \geq \lambda^G - 2\sigma^G) \& (M_i^G \leq \lambda^G + 2\sigma^G) \\ 0, & \text{otherwise} \end{cases}.$$

The electronic device 1302 may determine 1510 whether the global motion consistency measure meets one or more consistency criteria. For example, the electronic device 1302 may determine whether the global motion consistency measure is a consistency amount, is in a consistency range, and/or satisfies a consistency threshold. For instance, global motion consistency may be checked in accordance with the following equation:

$$\frac{\sum_{i=0}^{N^G} V_i}{N^G} \geq T,$$

where T is a consistency threshold. In some configurations, T may be 0.7 (determined experimentally, for example).

If the global motion consistency measure meets the one or more consistency criteria, the electronic device 1302 may perform 1512 foreground separation. For example, if the global motion consistency measure (e.g., $V_i$) is greater than or equal to a consistency threshold (e.g., T), the electronic device 1302 may perform 1512 foreground separation.

In some configurations, performing 1512 foreground separation may include calculating a separation metric based on the local motion pattern and the global motion pattern. For example, local motion vectors may be denoted $M^L=(m_{xi}^L, m_{yi}^L)$, where $m_{xi}^L$ is a horizontal motion component, $m_{yi}^L$ is a vertical motion component, and $i \in [0, N^L)$. $N^L$ denotes the total number of local motion vectors. For example, $N^L$ may denote the total number of originally generated local motion vectors or a total number of local motion vectors remaining after preprocessing. For each motion vector pair $M^L$, the electronic device 1302 may compute the separation metric as $$D^L = \text{abs}\left(\frac{M^L - \lambda^G}{2\sigma^G}\right)$$

in some configurations. For example, $D^L$ may indicate a motion difference between the local motion pattern and the global motion pattern (e.g., global motion model). For instance, the larger $D^L$ is, the more likely it is that the local motion vector corresponds to the foreground (e.g., an object of interest that is moving different from the background). In this example, the global motion model may include the global motion vector median $\lambda^G$ and the global motion vector standard deviation $\sigma^G$. Accordingly, the electronic device 1302 may calculate the fitting errors (e.g., the separation metric $D^L$) between the global motion model and the local motion pattern (e.g., $M^L$).

In some configurations, the electronic device 1302 may generate a foreground weight map based on the separation metric. In some examples, the foreground weight map may be generated by taking a maximum component of the separation metric (e.g., $D^L$), in either the horizontal (x) direction or vertical direction (y). For example, $W^L = \max(D_x^L, D_y^L)$. The foreground weight map (e.g., $W^L$ or W) may be optionally smoothed over time to produce a temporally smoothed weight map (e.g., $W_t$). The foreground weight map may be optionally refined over space to produce a spatially refined weight map (e.g., $W_s$). For example, the electronic device 1302 may multiply the foreground weight map by a centrally weighted kernel. In some configurations, the electronic device 1302 may both temporally smooth and spatially refine the weight map to produce a smoothed refined weight map (e.g., W'). The electronic device 1302 may optionally smooth a historical weight map (e.g., H) over time. Examples of weighting are given in connection with one or more of FIGS. 17-18.

In some configurations, weighting the motion vectors (e.g., the local motion vectors) may include rejecting (e.g., removing, eliminating, de-selecting, etc.) one or more motion vectors (e.g., one or more local motion vectors after pre-processing). For example, one or more motion vectors may be weighted to 0. For instance, one or more local motion vectors that match the global motion vector median (or mean) may result in a zero weight (e.g., a separation metric of 0, which may result in a weight of 0). Additionally or alternatively, one or more local motion vectors that are within a separation distance amount (e.g., less than a separation distance threshold) from the global motion vector median (or mean) may be assigned a weight of 0. Accordingly, one or more motion vectors (e.g., local motion vectors) with non-zero (e.g., >0) weights may be selected motion vectors. One or more motion vectors (e.g., local motion vectors) with zero weights may be non-selected motion vectors.

The electronic device 1302 may perform 1514 motion estimation using one or more weighted (e.g., selected) motion vectors. For example, the electronic device 1302 may perform 1514 motion estimation based on one or more local motion vectors that correspond to an object (e.g., object of interest or target object).

In some configurations, the electronic device 1302 may perform motion estimation as follows. For example, motion estimation may be performed in accordance with a weighted least squares approach. The electronic device 1302 may estimate scale and shift concurrently (e.g., simultaneously) using weighted least squares. For example, the electronic device 1302 may estimate the scale (e.g., size) and shift (e.g., translation) of a region of interest (e.g., bounding box). Weights (e.g., a weight map W, $W_t$, $W_s$ and/or W') may be calculated as described above (and/or as described in connection with one or more of FIGS. 17-18) based on a local motion pattern and a global motion pattern.

The weighted least squares approach may be accomplished in accordance with $L=\|Y-AX\|_2$, where L is a cost function, Y are points in a current frame, X are points in a previous frame and A is a transformation matrix (representing the transformation between the X points and Y points, for instance). For example, $A_{min}=(YwX^T)(XwX^T)^{-1}$, where w is a diagonal matrix with weights on the diagonal. The weights may be weights from a weight map (e.g., W, $W_t$, $W_s$, and/or W'). In some configurations, $Y=[x'_0, y'_0, x'_1, y'_1 \ldots]$, where Y is a set of points (e.g., a vector with dimensions 1×2N, where N is the number of motion vectors or point pairs).

$$X = \begin{bmatrix} x_0 & y_0 & x_1 & y_1 & \cdots \\ 1 & 0 & 1 & 0 & \cdots \\ 0 & 1 & 0 & 1 & \cdots \end{bmatrix},$$

where X is a stacked matrix of the points in the previous frame (corresponding to the points in Y from the current frame). $A_{min}=[S\ tx\ ty]$, where S is a scale, tx is a translation or shift in a horizontal direction and ty is a translation or shift in a vertical direction. $w=\text{diag}(w_0\ w_0\ w_1\ w_1\ \ldots)$. It should be noted that in this approach, the scale S may be constant (e.g., the same) for both horizontal and vertical directions. In other configurations, however, different scales (e.g., a horizontal scale and a vertical scale) may be used for the horizontal direction and for the vertical direction.

The electronic device 1302 may predict 1516 a region of interest (e.g., bounding box) based on the motion estimation. For example, the electronic device 1302 may generate a region of interest (for a subsequent frame, for example) with the shift and scale determined by the motion estimation.

In the case that the global motion consistency measure does not meet the one or more consistency criteria (e.g., consistency threshold), the electronic device 1302 may perform 1518 motion estimation using all motion vectors (e.g., all original motion vectors, all pre-processed local motion vectors and/or all pre-processed global motion vectors). The electronic device 1302 may predict 1516 a bounding box based on the motion estimation.

FIG. 16 is a diagram illustrating an example of an image 1675, a set of global motion vectors 1679, a region of interest 1678, a subsequent region of interest 1677, and a set of local motion vectors 1681. Specifically, FIG. 16 illustrates a set of local motion vectors 1681 inside of the region of interest 1678 (e.g., bounding box). In this example, the set of local motion vectors includes 64 local motion vectors 1681 (e.g., a grid of 8×8 local motion vectors within the region of interest 1678). A set of global motion vectors 1679 is also illustrated as spread over the frame. In this example, the set of global motion vectors includes 25 global motion vectors 1679 (e.g., a grid of 5×5 global motion vectors 1679).

As described above, an electronic device may determine a local motion pattern. In some configurations, determining a local motion pattern may include computing one or more motion vectors (with optical flow, for example) within a region of interest. In some configurations, calculating the local motion vectors may include determining forward and backward motion vectors (e.g., running forward and backward optical flow). For example, the electronic device 1302 may determine forward and backward trajectories (as described above, for instance). In some configurations, pre-processing may include measuring a distance error and/or rejecting unreliable vectors based on the distance error (e.g., motion vectors in the 20th percentile). For example, FIG. 16 illustrates some rejected local motion vectors 1681*b*, which may not be utilized (leaving the utilized local motion vectors 1681*a*).

As described above, an electronic device 1302 may determine a global motion pattern. In some configurations, determining a global motion pattern may include computing one or more motion vectors (with optical flow, for example). The global motion vectors 1679 may span a larger area than the local motion vectors 1681, for instance. In some configurations, global motion vectors may cover a particular proportion of an image. For example, the global motion vectors may span and/or consider 90% of the image (and may ignore borders, for instance). FIG. 16 illustrates global motion vectors 1679 on a coarse 5×5 grid. FIG. 16 further illustrates a global motion vector median 1682 (superimposed with each global motion vector 1679). As illustrated in FIG. 16, an object of interest (e.g., the face) may be tracked to a subsequent frame based on the local motion vectors 1681. For example, a subsequent region of interest 1677 (e.g., a region of interest corresponding to a subsequent frame) may be predicted based on the local motion vectors 1681.

Figure 17:
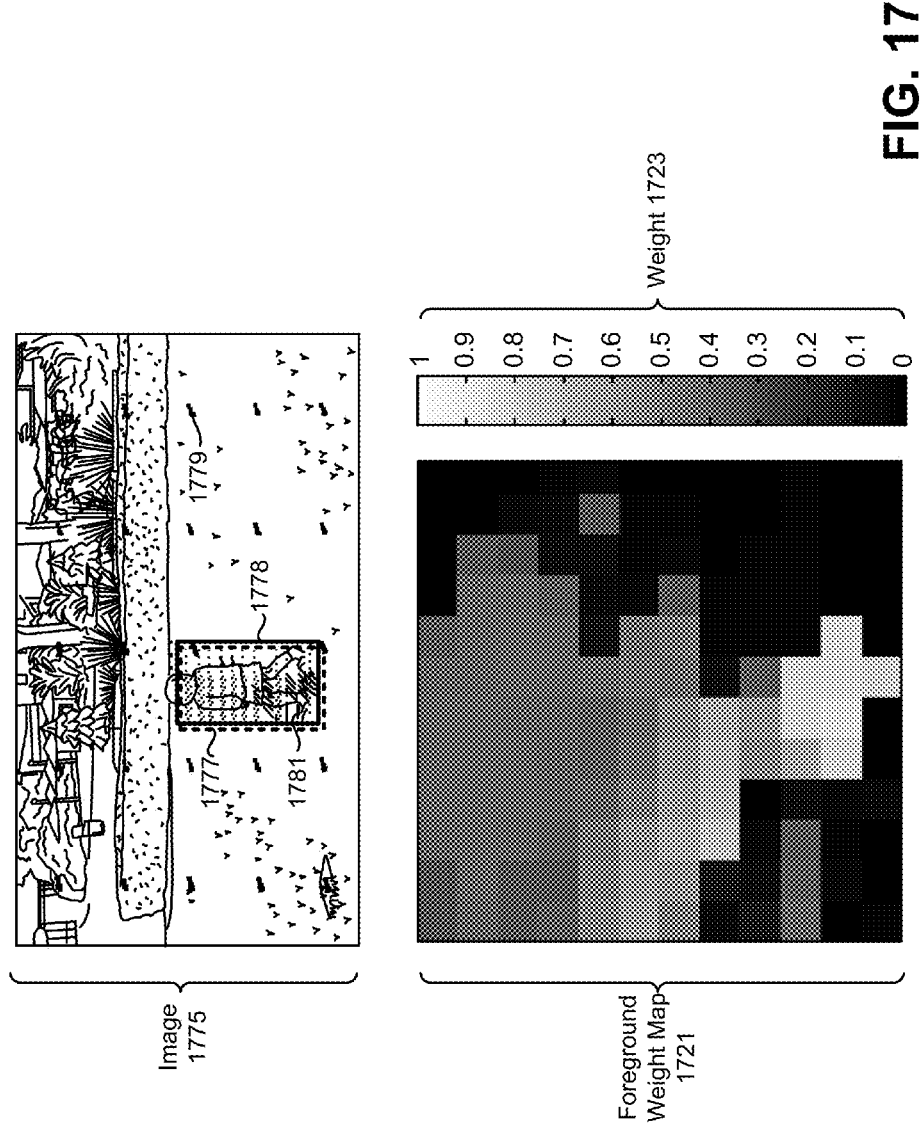
FIG. 17 illustrates an example of an image and a corresponding foreground weight map.

FIG. 17 illustrates an example of an image 1775 and a corresponding foreground weight map 1721. A set of global motion vectors 1779, a set of local motion vectors 1781, a region of interest 1778, and a subsequent region of interest 1777 are illustrated.

In some configurations, the electronic device 1302 may compute weights in accordance with one or more of the following equations. As described above, local motion vectors may be denoted $M^L=(m_{xi}^L, m_{yi}^L)$, where $i \in [0, N^L)$. The electronic device 1302 may also determine a separation metric. For example, for each motion vector pair $M^L$, the electronic device 1302 may compute $$D^L = \text{abs}\left(\frac{M^L - \lambda^G}{2\sigma^G}\right).$$

In some configurations, weights of a foreground weight map may be computed as $W^L = \max(D_x^L, D_y^L)$. For example, FIG. 17 illustrates one example of the foreground weight map 1721 (e.g., local weights $W^L$ corresponding to the region of interest 1778). It can be observed that areas of greater separation (between local and global motion) may exhibit higher weight 1723. In some configurations, the local weights or foreground weight map $W^L$ may be referred to as W for simplicity.

Figure 18:
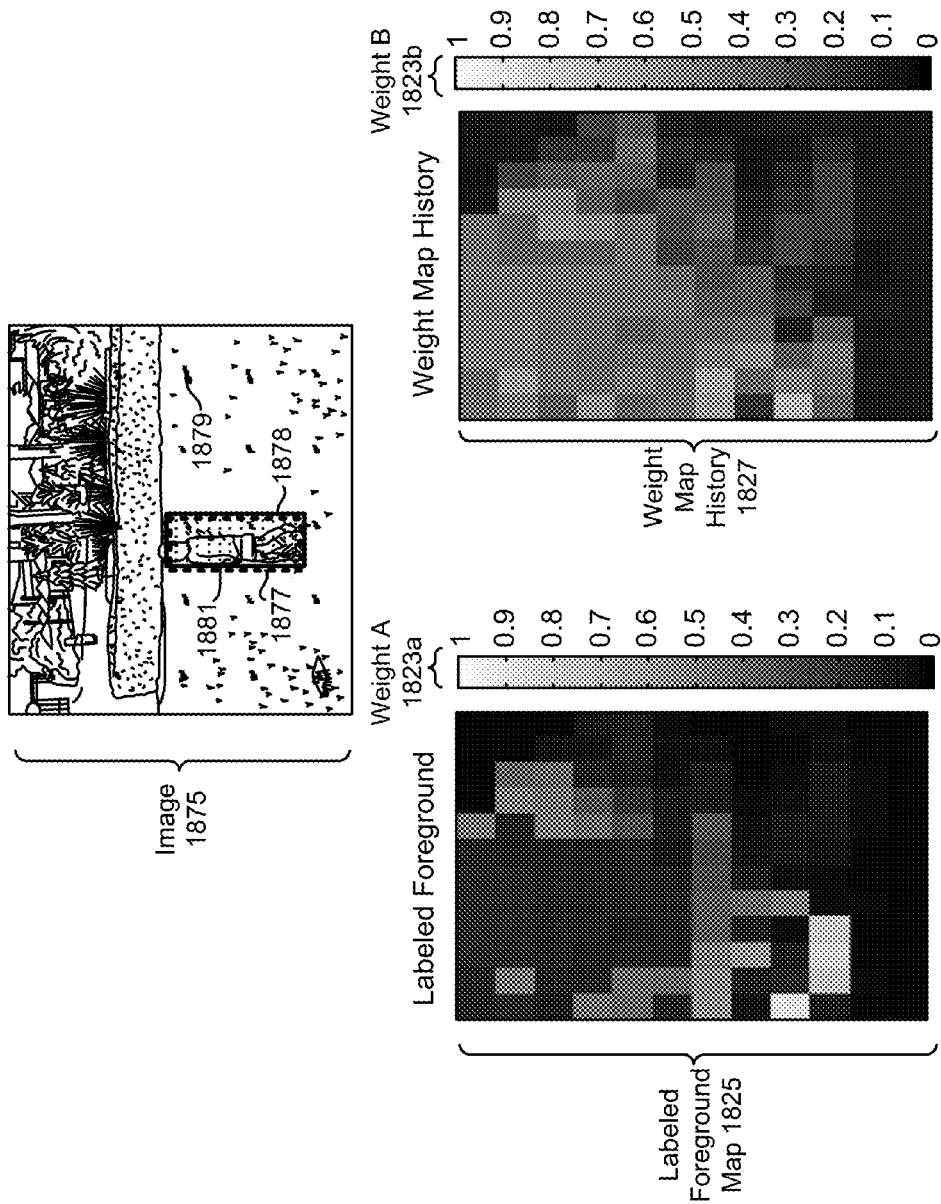
FIG. 18 illustrates an example of an image, a labeled foreground map and a weight map history.

FIG. 18 illustrates an example of an image 1875, a labeled foreground map 1825 and a weight map history 1827. A set of global motion vectors 1879, a set of local motion vectors 1881, a region of interest 1878, and a subsequent region of interest 1877 are illustrated. In particular, FIG. 18 illustrates an example of optional processing that may be performed on the weight map. Depending on the configuration, the systems and methods disclosed herein may determine (e.g., calculate) and/or utilize a weight map W (e.g., $W^L$), a temporally smoothed weight map (e.g., $W_t$), a spatially refined weight map (e.g., $W_s$), and/or a smoothed refined weight map (e.g., W'). For example, per frame weighting may not take temporal information into account. For instance, per frame weighting may be susceptible to outliers. One approach to ameliorate these issues is to use a history of weights to factor in temporal consistency. For example, a weight update model may be carried out in two steps. The first step may include updating a current weight map. This may be accomplished in accordance with the following equation: $W_t = \alpha H + (1-\alpha)W$. $\alpha$ may be a smoothing factor (and may give more weight to W, for example). The second step may include updating (e.g., smoothing) the history H (e.g., historical weight map or weight map history 1827). This may be accomplished in accordance with the following equation: $H' = \beta W + (1-\beta)H$. $\beta$ may give more weight to H.

The labeled foreground map 1825 illustrates one example of a current weight map corresponding to the region of interest 1878 (e.g., bounding box) in the image 1875. Weight A 1823a illustrates the weight value range in the labeled foreground map 1825. The weight map history 1827 illustrates one example of the weight map history corresponding to the region of interest 1878 (e.g., bounding box) in the image 1875. Weight B 1823b illustrates the weight value range in the weight map history 1827.

In some configurations, the electronic device 1302 may additionally or alternatively apply a central weighting constraint. The central weighting constraint may assume that an object of interest is in or near the center (e.g., always in the center) of the region of interest (e.g., bounding box). For example, more weight may be applied to the center of the region of interest (e.g., bounding box) than the boundaries. In some configurations, a weight update or applying a centrally weighted kernel (e.g., final weight update) may be accomplished in accordance with the following equation. $W_s = W \cdot C$, where C is the centrally weighted kernel. In some configurations, the electronic device 1302 may perform both temporal smoothing and spatial refining to produce a smoothed refined weight map. For example, $W' = W_t C = (\alpha H + (1-\alpha)W) \cdot C$.

Accordingly, no temporal smoothing or spatial refining may be utilized in some configurations. For example, an object may be tracked based on a weight map (e.g., W, without temporal smoothing or spatial refining) in some configurations. In another example, an object may be tracked based on a temporally smoothed weight map (e.g., $W_t$). In another example, an object may be tracked based on a spatially refined weight map (e.g., $W_s$). In yet another example, an object may be tracked based on a smoothed refined weight map (e.g., W').

Figure 19:
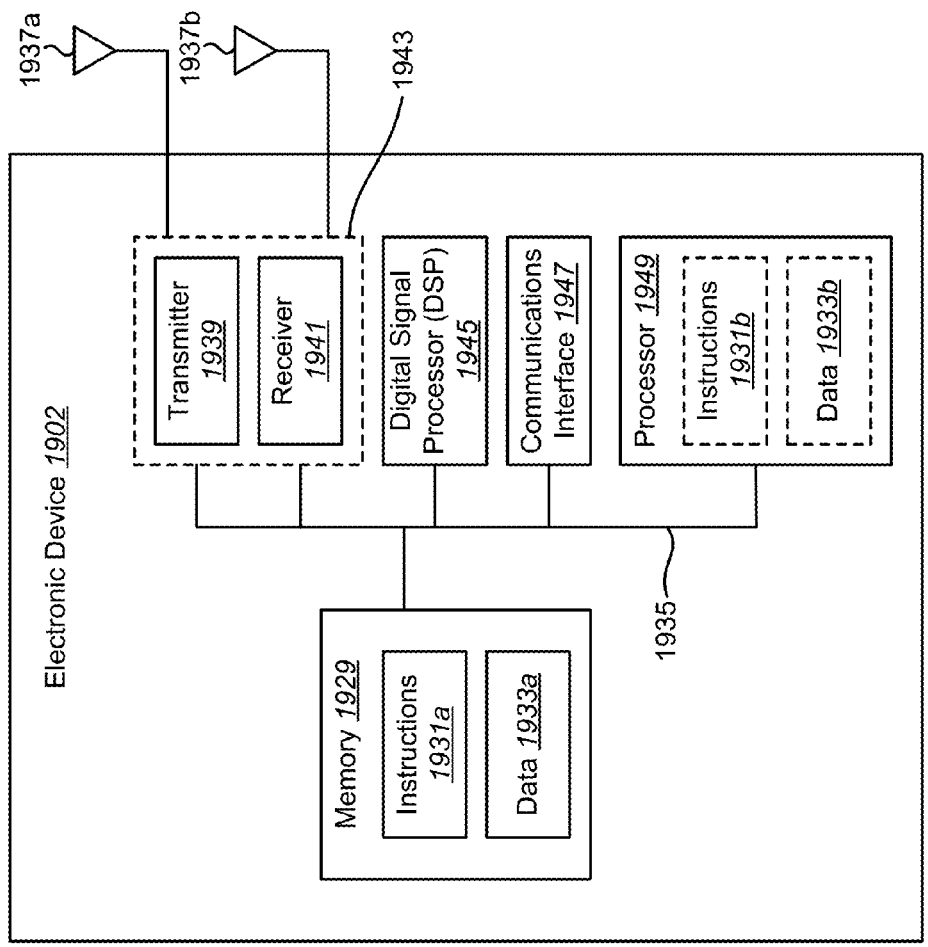
FIG. 19 illustrates certain components that may be included within an electronic device configured to implement various configurations of the systems and methods disclosed herein.

FIG. 19 illustrates certain components that may be included within an electronic device 1902 configured to implement various configurations of the systems and methods disclosed herein. The electronic device 1902 may be an access terminal, a mobile station, a user equipment (UE), a smartphone, a digital camera, a video camera, a tablet device, a laptop computer, etc. The electronic device 1902 may be implemented in accordance with one or more of the electronic devices 102, 1302 described herein. The electronic device 1902 includes a processor 1949. The processor 1949 may be a general purpose single- or multi-chip microprocessor (e.g., an ARM), a special purpose microprocessor (e.g., a digital signal processor (DSP)), a microcontroller, a programmable gate array, etc. The processor 1949 may be referred to as a central processing unit (CPU). Although just a single processor 1949 is shown in the electronic device 1902, in an alternative configuration, a combination of processors (e.g., an ARM and DSP) could be implemented.

The electronic device 1902 also includes memory 1929. The memory 1929 may be any electronic component capable of storing electronic information. The memory 1929 may be embodied as random access memory (RAM), read-only memory (ROM), magnetic disk storage media, optical storage media, flash memory devices in RAM, on-board memory included with the processor, EPROM memory, EEPROM memory, registers, and so forth, including combinations thereof.

Data 1933a and instructions 1931a may be stored in the memory 1929. The instructions 1931a may be executable by the processor 1949 to implement one or more of the methods described herein. Executing the instructions 1931a may involve the use of the data 1933a that is stored in the memory 1929. When the processor 1949 executes the instructions 1931, various portions of the instructions 1931b may be loaded onto the processor 1949, and various pieces of data 1933b may be loaded onto the processor 1949.

The electronic device 1902 may also include a transmitter 1939 and a receiver 1941 to allow transmission and reception of signals to and from the electronic device 1902. The transmitter 1939 and receiver 1941 may be collectively referred to as a transceiver 1943. One or more antennas 1937a-b may be electrically coupled to the transceiver 1943. The electronic device 1902 may also include (not shown) multiple transmitters, multiple receivers, multiple transceivers and/or additional antennas.

The electronic device 1902 may include a digital signal processor (DSP) 1945. The electronic device 1902 may also include a communications interface 1947. The communications interface 1947 may allow and/or enable one or more kinds of input and/or output. For example, the communications interface 1947 may include one or more ports and/or communication devices for linking other devices to the electronic device 1902. In some configurations, the communications interface 1947 may include the transmitter 1939, the receiver 1941, or both (e.g., the transceiver 1943). Additionally or alternatively, the communications interface 1947 may include one or more other interfaces (e.g., touchscreen, keypad, keyboard, microphone, camera, etc.). For example, the communication interface 1947 may enable a user to interact with the electronic device 1902.

The various components of the electronic device 1902 may be coupled together by one or more buses, which may include a power bus, a control signal bus, a status signal bus, a data bus, etc. For the sake of clarity, the various buses are illustrated in FIG. 19 as a bus system 1935.

The term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The phrase "based on" does not mean "based only on," unless expressly specified otherwise. In other words, the phrase "based on" describes both "based only on" and "based at least on."

The term "processor" should be interpreted broadly to encompass a general purpose processor, a central processing unit (CPU), a microprocessor, a digital signal processor (DSP), a controller, a microcontroller, a state machine, and so forth. Under some circumstances, a "processor" may refer to an application specific integrated circuit (ASIC), a programmable logic device (PLD), a field programmable gate array (FPGA), etc. The term "processor" may refer to a combination of processing devices, e.g., a combination of a DSP and a microprocessor, a plurality of microprocessors, one or more microprocessors in conjunction with a DSP core, or any other such configuration.

The term "memory" should be interpreted broadly to encompass any electronic component capable of storing electronic information. The term memory may refer to various types of processor-readable media such as random access memory (RAM), read-only memory (ROM), non-volatile random access memory (NVRAM), programmable read-only memory (PROM), erasable programmable read-only memory (EPROM), electrically erasable PROM (EEPROM), flash memory, magnetic or optical data storage, registers, etc. Memory is said to be in electronic communication with a processor if the processor can read information from and/or write information to the memory. Memory that is integral to a processor is in electronic communication with the processor.

The terms "instructions" and "code" should be interpreted broadly to include any type of computer-readable statement(s). For example, the terms "instructions" and "code" may refer to one or more programs, routines, subroutines, functions, procedures, etc. "Instructions" and "code" may comprise a single computer-readable statement or many computer-readable statements.

The functions described herein may be implemented in software or firmware being executed by hardware. The functions may be stored as one or more instructions on a computer-readable medium. The terms "computer-readable medium" or "computer-program product" refers to any tangible storage medium that can be accessed by a computer or a processor. By way of example, and not limitation, a computer-readable medium may comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray® disc where disks usually reproduce data magnetically, while discs reproduce data optically with lasers. It should be noted that a computer-readable medium may be tangible and non-transitory. The term "computer-program product" refers to a computing device or processor in combination with code or instructions (e.g., a "program") that may be executed, processed or computed by the computing device or processor. As used herein, the term "code" may refer to software, instructions, code or data that is/are executable by a computing device or processor.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio and microwave, then the coaxial cable, fiber optic cable, twisted pair, DSL, or wireless technologies such as infrared, radio and microwave are included in the definition of transmission medium.

The methods disclosed herein comprise one or more steps or actions for achieving the described method. The method steps and/or actions may be interchanged with one another without departing from the scope of the claims. In other words, unless a specific order of steps or actions is required for proper operation of the method that is being described, the order and/or use of specific steps and/or actions may be modified without departing from the scope of the claims.

Further, it should be appreciated that modules and/or other appropriate means for performing the methods and techniques described herein, can be downloaded and/or otherwise obtained by a device. For example, a device may be coupled to a server to facilitate the transfer of means for performing the methods described herein. Alternatively, various methods described herein can be provided via a storage means (e.g., random access memory (RAM), read-only memory (ROM), a physical storage medium such as a compact disc (CD) or floppy disk, etc.), such that a device may obtain the various methods upon coupling or providing the storage means to the device.

It is to be understood that the claims are not limited to the precise configuration and components illustrated above. Various modifications, changes and variations may be made in the arrangement, operation and details of the systems, methods, and apparatus described herein without departing from the scope of the claims.

What is claimed is:

1. A method performed by an electronic device, comprising:
    determining a local motion pattern by determining a set of local motion vectors within a region of interest between a previous frame and a current frame;
    determining a global motion pattern by determining a set of global motion vectors within an area between the previous frame and the current frame, wherein the area is larger than the region of interest;
    calculating a global motion consistency measure, the global motion consistency measure indicative of a consistency of the set of global motion vectors relative to an average of the set of global motion vectors;
    calculating a separation metric based on the local motion pattern and the global motion pattern in a case that the global motion consistency measure meets a consistency criterion, wherein the separation metric indicates a motion difference between the local motion pattern and the global motion pattern; and tracking an object based on the separation metric in the case that the global motion consistency measure meets the consistency criterion.

2. The method of claim 1, further comprising:
measuring a distance error of each of the local motion vectors; and
rejecting one or more of the local motion vectors that have an amount of distance error.

3. The method of claim 1, wherein the global motion consistency measure indicates a number of global motion vectors within a range from the average.

4. The method of claim 1, wherein calculating the separation metric comprises:
fitting the global motion pattern to a global motion model; and
calculating fitting errors between the global motion model and the local motion pattern.

5. The method of claim 4, wherein the global motion model comprises at least one statistical measure of the global motion pattern.

6. The method of claim 1, further comprising calculating a foreground weight map based on the separation metric.

7. The method of claim 6, further comprising smoothing the foreground weight map over time.

8. The method of claim 6, further comprising refining the foreground weight map over space.

9. The method of claim 8, wherein refining the foreground weight map over space comprises multiplying the foreground weight map by a centrally weighted kernel.

10. The method of claim 1, further comprising smoothing a historical weight map over time.

11. An electronic device, comprising:
a processor configured to:
determine a local motion pattern by determining a set of local motion vectors within a region of interest between a previous frame and a current frame;
determine a global motion pattern by determining a set of global motion vectors within an area between the previous frame and the current frame, wherein the area is larger than the region of interests;
calculate a global motion consistency measure, the global motion consistency measure indicative of a consistency of the global motion vectors relative to an average of the set of global motion vectors;
calculate a separation metric based on the local motion pattern and the global motion pattern in a case that the global motion consistency measure meets a consistency criterion, wherein the separation metric indicates a motion difference between the local motion pattern and the global motion pattern; and
track an object based on the separation metric in the case that the global motion consistency measure meets the consistency criterion.

12. The electronic device of claim 11, wherein the processor is configured to measure a distance error of each of the local motion vectors and reject one or more of the local motion vectors that have an amount of distance error.

13. The electronic device of claim 11, wherein the global motion consistency measure indicates a number of global motion vectors within a range from the average.

14. The electronic device of claim 11, wherein the processor is configured to:
fit the global motion pattern to a global motion model; and
calculate fitting errors between the global motion model and the local motion pattern.

15. The electronic device of claim 14, wherein the global motion model comprises at least one statistical measure of the global motion pattern.

16. The electronic device of claim 11, wherein the processor is configured to calculate a foreground weight map based on the separation metric.

17. The electronic device of claim 16, wherein the processor is configured to smooth the foreground weight map over time.

18. The electronic device of claim 16, wherein the processor is configured to refine the foreground weight map over space.

19. The electronic device of claim 18, wherein the processor is configured to multiply the foreground weight map by a centrally weighted kernel.

20. The electronic device of claim 11, wherein the processor is configured to smooth a historical weight map over time.

21. An apparatus, comprising:
means for determining a local motion pattern, wherein the means for determining the local motion pattern comprises means for determining a set of local motion vectors within a region of interest between a previous frame and a current frame;
means for determining a global motion pattern, wherein the means for determining the global motion pattern comprises means for determining a set of global motion vectors within an area between the previous frame and the current frame, wherein the area is larger than the region of interest;
means for calculating a global motion consistency measure, the global motion consistency measure indicative of a consistency of the global motion vectors relative to an average of the set of global motion vectors;
means for calculating a separation metric based on the local motion pattern and the global motion pattern in a case that the global motion consistency measure meets a consistency criterion, wherein the separation metric indicates a motion difference between the local motion pattern and the global motion pattern; and
means for tracking an object based on the separation metric in the case that the global motion consistency measure meets the consistency criterion.

22. The apparatus of claim 21, further comprising:
means for measuring a distance error of each of the local motion vectors; and
means for rejecting one or more of the local motion vectors that have an amount of distance error.

23. The apparatus of claim 21, wherein the global motion consistency measure indicates a number of global motion vectors within a range from the average.

24. The apparatus of claim 21, wherein the means for calculating the separation metric comprises:
means for fitting the global motion pattern to a global motion model; and
means for calculating fitting errors between the global motion model and the local motion pattern.

25. The apparatus of claim 21, further comprising means for calculating a foreground weight map based on the separation metric.

26. A computer-program product, comprising a non-transitory computer-readable medium having instructions thereon, the instructions comprising:
code for causing an electronic device to determine a local motion pattern by determining a set of local motion vectors within a region of interest between a previous frame and a current frame;

code for causing the electronic device to determine a global motion pattern by determining a set of global motion vectors within an area between the previous frame and the current frame, wherein the area is larger than the region of interest;

code for causing the electronic device to calculate a global motion consistency measure, the global motion consistency measure indicative of a consistency of the global motion vectors relative to an average of the set of global motion vectors;

code for causing the electronic device to calculate a separation metric based on the local motion pattern and the global motion pattern in a case that the global motion consistency measure meets a consistency criterion, wherein the separation metric indicates a motion difference between the local motion pattern and the global motion pattern; and code for causing the electronic device to track an object based on the separation metric in the case that the global motion consistency measure meets the consistency criterion.

27. The computer-program product of claim 26, further comprising:

code for causing the electronic device to measure a distance error of each of the local motion vectors; and code for causing the electronic device to reject one or more of the local motion vectors that have an amount of distance error.

28. The computer-program product of claim 26, wherein the global motion consistency measure indicates a number of global motion vectors within a range from the average.

29. The computer-program product of claim 26, wherein the code for causing the electronic device to calculate the separation metric comprises:

code for causing the electronic device to fit the global motion pattern to a global motion model; and code for causing the electronic device to calculate fitting errors between the global motion model and the local motion pattern.

30. The computer-program product of claim 26, further comprising code for causing the electronic device to calculate a foreground weight map based on the separation metric.

* * * * *